US011134316B1

(12) United States Patent
Pavlosky et al.

(10) Patent No.: US 11,134,316 B1
(45) Date of Patent: Sep. 28, 2021

(54) INTEGRATED SHOPPING WITHIN LONG-FORM ENTERTAINMENT

(71) Applicant: SHOPSEE, INC., Santa Barbara, CA (US)

(72) Inventors: Charley Pavlosky, Santa Barbara, CA (US); Traci Gilland, New York, NY (US); Tony Fannin, Indianapolis, IN (US); Eric Wickens, Fishers, IN (US); John Patrick Wooton, Fishers, IN (US)

(73) Assignee: Shopsee, Inc., Santa Barbara, CA (US)

( * ) Notice: Subject to any disclaimer, the term of this patent is extended or adjusted under 35 U.S.C. 154(b) by 0 days.

(21) Appl. No.: 15/855,965

(22) Filed: Dec. 27, 2017

Related U.S. Application Data

(60) Provisional application No. 62/439,520, filed on Dec. 28, 2016.

(51) Int. Cl.
*H04N 21/478* (2011.01)
*G06Q 50/00* (2012.01)
*H04N 21/81* (2011.01)
*H04N 21/4788* (2011.01)
(Continued)

(52) U.S. Cl.
CPC ... *H04N 21/47815* (2013.01); *G06Q 30/0257* (2013.01); *G06Q 30/0277* (2013.01); *G06Q 30/0633* (2013.01); *G06Q 50/01* (2013.01); *H04N 21/4788* (2013.01); *H04N 21/812* (2013.01)

(58) Field of Classification Search
CPC .. H04N 21/80; H04N 21/812; H04N 21/8126; H04N 21/8133; H04N 21/478; H04N 21/47815; H04N 21/4788; G06Q 30/0257; G06Q 30/0277; G06Q 30/0633; G06Q 50/01
See application file for complete search history.

(56) References Cited

U.S. PATENT DOCUMENTS 5,828,839 A * 10/1998 Moncreiff ............... G07F 7/00
709/204
7,000,242 B1 2/2006 Haber
7,237,252 B2 6/2007 Billmaier
(Continued)

FOREIGN PATENT DOCUMENTS

EP    1111926 B1 * 10/2015 ......... H04N 21/4782

*Primary Examiner* — James R Sheleheda
(74) *Attorney, Agent, or Firm* — Wilson Sonsini Goodrich & Rosati

(57) ABSTRACT

Systems for utilizing video media include processing the video media that has a plurality of objects within one or more frames of the video media to generate a first interactive video layer. The processing includes associating product information to one or more of the plurality of objects to correspondingly form one or more items of interest, tracking the one or more items of interest through the one or more frames of the video media, and assigning a selectable visual indicator for each of the one or more items of interest. The first interactive video layer is distributed with the video media to a viewer. A second interactive video layer having a social media portion for the user to interact with another user is also distributed with the video media. The system generates video data that includes video media, the first interactive video layer, and the second interactive video layer.

19 Claims, 14 Drawing Sheets

(51) Int. Cl.
*G06Q 30/02* (2012.01)
*G06Q 30/06* (2012.01)

(56) References Cited

U.S. PATENT DOCUMENTS

| | | | |
|---|---|---|---|
| 7,266,835 B2 | 9/2007 | Halbert | |
| 7,356,830 B1 | 4/2008 | Dimitrova | |
| 7,890,380 B2 | 2/2011 | Stefanik et al. | |
| 7,899,705 B2 | 3/2011 | Fuisz | |
| 8,091,103 B2 | 1/2012 | Cope | |
| 8,132,212 B2 | 3/2012 | Huegel | |
| 8,141,112 B2 | 3/2012 | Cope et al. | |
| 8,312,491 B2 | 11/2012 | Cope et al. | |
| 8,434,113 B1 | 4/2013 | Taymor | |
| 8,453,171 B2 | 5/2013 | Koplar | |
| 8,468,565 B2 | 6/2013 | Thomas et al. | |
| 8,516,533 B2 | 8/2013 | Davis et al. | |
| 8,620,769 B2 | 12/2013 | Yates | |
| 8,667,526 B2 | 3/2014 | Afram et al. | |
| 8,769,584 B2 | 7/2014 | Neumeier et al. | |
| 8,776,140 B2 | 7/2014 | Huegel et al. | |
| 8,790,176 B2 | 7/2014 | Hopf et al. | |
| 8,819,732 B2 | 8/2014 | Karaoguz et al. | |
| 8,850,480 B2 | 9/2014 | Chane et al. | |
| 8,856,830 B2 | 10/2014 | Fuisz | |
| 8,910,201 B1 | 12/2014 | Zamiska et al. | |
| 9,021,528 B2 | 4/2015 | Morceau et al. | |
| 9,087,358 B1 | 7/2015 | Giorgalli | |
| 9,230,241 B1 * | 1/2016 | Singh | H04N 21/41407 |
| 9,319,745 B2 | 4/2016 | Rankine et al. | |
| 9,344,774 B2 | 5/2016 | McDevitt | |
| 9,363,568 B2 | 6/2016 | Wheatley et al. | |
| 10,045,091 B1 * | 8/2018 | Nijim | H04N 21/25883 |
| 10,440,436 B1 * | 10/2019 | Taylor | H04N 21/234345 |
| 2001/0051989 A1 * | 12/2001 | Moncreiff | H04N 21/4781 709/206 |
| 2004/0109087 A1 | 6/2004 | Robinson et al. | |
| 2004/0122746 A1 | 6/2004 | Charlier et al. | |
| 2005/0262542 A1 * | 11/2005 | DeWeese | H04N 21/454 725/106 |
| 2009/0063995 A1 * | 3/2009 | Baron | H04N 21/25866 715/753 |
| 2009/0259957 A1 * | 10/2009 | Slocum | H04N 21/8126 715/765 |
| 2009/0307092 A1 | 12/2009 | Gugliuzza et al. | |
| 2010/0169917 A1 * | 7/2010 | Harboe | H04N 21/25883 725/34 |
| 2011/0067051 A1 | 3/2011 | Karaoguz et al. | |
| 2012/0159327 A1 * | 6/2012 | Law | H04N 21/47217 715/716 |
| 2012/0167145 A1 * | 6/2012 | Incorvia | H04N 21/4725 725/60 |
| 2012/0197763 A1 | 8/2012 | Moreira | |
| 2014/0325557 A1 * | 10/2014 | Evans | H04N 21/4307 725/34 |
| 2015/0208131 A1 | 7/2015 | Chatter et al. | |
| 2015/0215674 A1 | 7/2015 | Provencher et al. | |
| 2015/0245103 A1 | 8/2015 | Conte | |
| 2016/0066051 A1 | 3/2016 | Caidar et al. | |
| 2016/0189269 A1 | 6/2016 | Wesoky et al. | |
| 2017/0187769 A1 * | 6/2017 | Paglia | H04L 51/046 |

* cited by examiner

INTEGRATED SHOPPING WITHIN LONG-FORM ENTERTAINMENT

CROSS-REFERENCE

This application claims the benefit of U.S. Provisional Application Ser. No. 62/439,520, filed Dec. 28, 2016, which application is incorporated herein by reference.

FIELD OF THE INVENTION

The present invention relates generally to video processing technology, and more particularly, relates to a method and apparatus for providing one or more interactive video layers with video media.

BACKGROUND OF THE INVENTION

For many years, people have enjoyed television and movies as a form of long-form entertainment. Viewers of this form of entertainment are often interested in many aspects of the lives of the characters in television and movies. For example, viewers often emulate or desire the clothes, hairstyles, jewelry, electronics, cars, and other social and economic behaviors of the characters on their favorite TV shows or movies.

Commercials have long been used by marketers to raise consumer awareness of products and services by directly advertising between programming segments on television. However, media companies and advertisers are facing a dramatic shift in consumer behavior regarding online entertainment. Many consumers view commercials as unwanted interruptions and modern technology is enabling many consumers to avoid watching commercials at all or reducing their exposure to these interruptions. Many consumers are avoiding watching commercials by employing advertisement blocking technology in mass numbers. Alternately many consumers are not buying traditional cable services or are discontinuing their traditional cable services, i.e., cutting the cable, and simply finding alternative sources of entertainment such as NETFLIX®, HULU®, HBO®, and AMAZON® services. Cutting the cable can have disastrous results for television shows by reducing the number of available viewers and thereby reducing potential revenue for advertisers.

For example, an average television show produced in Hollywood with traditional and online distribution combined is about 1 million viewers. That is a low benchmark for value and a television show that continues to perform at that level will ultimately be cancelled in most instances, within 3-6 months of initial distribution resulting in a monetary loss for the producers and owners of the television show. The above mentioned consumer behaviors are increasingly problematic for advertisers because digital advertising is less effective when there simply are not enough viewers of the television show. As a result, advertising revenue is greatly reduced for content providers, producers, and streaming services of these shows.

Another form of entertainment is movies, which typically do not have commercials and are somewhat more appealing to consumers who dislike commercials. However, although commercials are not shown in movies, many consumers simply refuse to pay a larger sum of money for viewing a movie in a movie theater when they can simply view the same movie or another form of entertainment for a much smaller amount of money on other online entertainment services. Online or streaming entertainment services are gaining in popularity due to their ease of use, low cost, and no commercials. However, these online entertainment services miss an opportunity for added revenue without advertisers populating their sites.

SUMMARY OF THE INVENTION

A unique method of aligning the interests of viewers, media companies, and advertisers into a seamless entertainment and marketing experience has been developed. Unique methods of creating one or more interactive video layers that are integrated into a form of entertainment and delivered to users as an online streaming and advertising service. These interactive video layers include a shopping layer that integrates within the entertainment without interruption of the entertainment and is immune to ad blocking and a personal living room that integrates a social media service within the entertainment without interruption of the entertainment. Another interactive video layer includes interactive side rooms in which users can experience a deeper immersion of the television show or movie experience.

The unique method of generating several interactive video layers onto one platform can be integrated into an existing platform for online streaming of long-form entertainment such as television shows, movies, or other videos. These interactive video layers create a unique model for online advertising within the long-form entertainment. The unique method can generate a first interactive video layer, a second interactive video layer, and a third interactive video layer (including additional interactive video layers) that are integrated onto online streaming entertainment such as long-form entertainment and delivered to a user. As users view the online streaming entertainment with one of the interactive video layers turned on, they are able to purchase the products and/or services that have been integrated into the entertainment while the user views the layer and entertainment on their personal device. This allows users to control their shopping experience without permanent interruption such as windows or prompts that other technology uses. As users view the online streaming entertainment with a second of the interactive video layers turned on, they are able to interact or talk with other users in a private form of communication on their personal device while watching a television show or movie. As users view the online streaming entertainment with a third of the interactive video layers turned on, they are able to interact with an interactive section that mimics the streaming entertainment environment that the user is watching. These interactive video layers can be applied to the streaming entertainment all at once or one at a time.

A unique computer-implemented method of processing video media, in particular, long-form entertainment has been developed. The video media has a plurality of objects within one or more frames of the video media that is processed to generate a first interactive video layer. The processing includes associating product information to one or more of the plurality of objects to correspondingly form one or more items of interest. The product information can include an image associated with the product, product name, and a product description. This product information can be valid for a specific date range and geographic location for delivery of the first interactive video layer. In one embodiment, after a specified date range has passed, it will be possible to associate new or different product information to the same or different one or more of the plurality of objects for a new specified date range. In another embodiment, no date range is needed to offer consumers new or different product information. In one embodiment, the new or different product is analogous to the original product. For example, if the user selects an item of clothing worn in the video media, the product information of a non-identical, but analogous, clothing item can be displayed. In another embodiment, the new or different product is presented based on what other users who selected the item have purchased. The new product information can be geographically-targeted or audience-targeted advertising. The ability to update the new product information means the producer's vision for video content can be managed and blended with advertiser and sponsor messages in an off-line, cloud based console, and then delivered as unique experiences that are targeted to viewers based on time, day, location, device, demographic, or other characteristics. Therefore ad blocking by a viewer can be avoided since the advertiser content is selected for the product information and then associated with the one or more of the plurality of objects to create new items of interest and blended into the video media for a specific user. The processing also includes tracking the one or more items of interest through the one or more frames of the video media. The tracking follows the items of interest throughout all of the frames of the video media that the item of interest is in. The processing can include assigning a selectable visual indicator for each of the one or more items of interest. During rendering of the video data on the viewer, the selectable visual indicators for the one or more items of interest are displayed from the first interactive video layer when the first interactive video layer is turned on. When the user makes a purchase by clicking or selecting the selectable visual indicator to an on position, the user is not directed to another web site; instead, the first interactive video layer is still on while video media is streaming content. Beneficially, the user never leaves the video media and is able to purchase the item of interest while watching their television show or movie and the user continues to view more items of interest as the television show or movie plays.

The second of the interactive video layers includes social media which allows a user to interact with other users thereby eliminating the need for a second screen (such as a smart phone, tablet, or other personal device) for such an interaction while watching the television show, episode, movie, or other forms of media entertainment. The second of the interactive video layers will provide a public area for users to see a public feed of viewers' comments and reactions to the video media. The second of the interactive video layers will also provide a private area that only invited users can comment, share, and see this social media feed in real time. The data created from the comments of users has great appeal to advertisers and media companies. The detailed comments can be aggregated and provided to advertisers and media companies. These data can be used to infer the emotional state of the viewers and individual likes and dislikes, behaviors, and other characteristics of the viewers.

The third of the interactive video layers includes an interactive section that mimics the streaming entertainment environment that the user is watching on the episode, television show, movie, or other entertainment. For example, the show's environment can be a bar, fantasy world, apartment, house, or other environment and the third interactive video layer includes an interactive section with a similar environment. The third of the interactive video layers can also include games, bonus content from producers of the show, promotional content, merchandise, interactions with other show fans in a public setting, and the ability to watch related shows or videos, to name a few things that can be included.

In some embodiments of the disclosure, users' actions are recorded. In some embodiments, a user's action includes selecting a product for viewing, purchasing an item, sharing an item via the social media layer, In some embodiments, these data are used to provide advertisers and businesses feedback on the interest generated by their products or services. Purchase information of analogous products.

Therefore some of the benefits of the interactive layers for advertisers and media owners include additional merchandising revenue from shopping, aggregation of user metadata, and the social interaction interfaces between viewers which results in the cross-pollination of the viewers once the viewers begin interacting with the content and sharing it with friends or other users either in the interactive layer or on their own outside social media feeds. The resultant pollination creates a mass user/viewer experience, which then brings more sets of eyes to the media show, thus substantially increasing advertising revenues that content producers and distributors may charge their advertising partners in order to be a part of that particular show. The interactive layers are a plug-in, non-invasive feature that can be added to any media site, which requires no additional or very few architecture requirements on the part of the subscriber/host of the media site.

Embodiment 1 is a method for providing information on items, services, or songs in a video media comprising:
  a) receiving the video media having a plurality of visual or audio objects in one or more frames of the video media;
  b) processing the video media to generate a first interactive video layer, wherein the processing includes:
    i. identifying one or more of the plurality of visual or audio objects within the video media,
    ii. associating product information to one or more of the plurality of visual or audio objects to correspondingly form one or more items, services, or songs of interest;
    iii. tracking the one or more items, services, or songs of interest through the one or more frames of the video media; and
    iv. assigning a selectable visual indicator for each of the one or more items, services, or songs of interest;
  c) providing both the first interactive video layer and a second interactive video layer having a social media portion for the user to interact with at least one guest, and
  d) distributing the information on items, services, or songs in a video media to a viewer.

Embodiment 2 is the method of embodiment 1, further comprising: generating a video data that includes the video media, the first interactive video layer, and the second interactive video layer; and providing the video data to a user of a viewer via a network.

Embodiment 3 is the method of embodiment 2, further comprising: enabling the user to present the video data with or without the first interactive video layer being turned on or off based on selection by the user to view or not view the first interactive video layer, respectively; and enabling the user to present the video data with or without the second interactive video layer being turned on or off based on selection by the user to view or not view the second interactive video layer, respectively.

Embodiment 4 is the method of embodiment 3, further comprising: displaying the video media and the first interactive video layer to the viewer; and selecting one of the selectable visual indicators by the user to display marketing information of the corresponding item, song, or service of interest to the viewer.

Embodiment 5 is the method of embodiment 4, further comprising purchasing the selected item, song, or service of interest from the marketing information.

Embodiment 6 is the method of embodiment 5, wherein the purchasing occurs while the video media is being displayed to the viewer.

Embodiment 7 is the method of embodiment 1, further comprising copying a timed portion of the video data to a clip list based on a selection of an item, service, or song of interest by the user.

Embodiment 8 is the method of embodiment 1, further comprising collecting data based on actions taken by the user.

Embodiment 9 is the method of embodiment 1, further comprising: removing the product information from the one or more of the plurality of objects; and associating different product information with the one or more of the plurality of objects.

Embodiment 10 is the method of embodiment 1, further comprising providing a third interactive video layer having one or more visual indicators to the server for distribution with the video media to the viewer.

Embodiment 11 is the method of embodiment 10, wherein the one or more visual indicators include a link for one or more of a second video media, a side room digital layer, a promotional video, a game, and/or merchandise.

Embodiment 12 is the method of embodiment 1, wherein generating the video data includes the third interactive video layer.

Embodiment 13 is the method of claim 1, wherein the video media includes one of a television episode or a movie.

Embodiment 14 is the method of embodiment 1, wherein identifying one or more of the plurality of visual or audio objects is performed manually through the input of spatial and/or temporal data for each item, song, or service within the video media.

Embodiment 15 is the method of embodiment 1, wherein identifying one or more of the plurality of visual or audio objects is performed automatically by a computer program for visual and/or audio recognition and mapping.

Embodiment 16 is the method of embodiment 1, wherein the first and second interactive layers are unaffected by ad blocking software.

Embodiment 17 is a computer readable media encoded with instructions that, when executed by a processor, cause the processor to carry out at least the following steps:
(a) processing video media to generate a first interactive video layer, wherein the processing includes:
  i. identifying one or more of the plurality of visual or audio objects within the video media;
  ii. associating product information to one or more of the plurality of visual or audio objects to correspondingly form one or more items, services, or songs of interest;
  iii. tracking the one or more items, services, or songs of interest through the one or more frames of the video media; and
  iv. assigning a selectable visual indicator for each of the one or more items, services, or songs of interest; and
b) providing both the first interactive video layer and a second interactive video layer having a social media portion for the user to interact with at least one guest.

Embodiment 18 is the computer readable media of embodiment 17, wherein the instructions, when executed by the processor, cause the processor to further carry out at least the following steps: generating a video data that includes the video media, the first interactive video layer, and the second interactive video layer; and providing the video data to a user of a viewer via a network.

Embodiment 19 is the computer readable media of embodiment 18, wherein the instructions, when executed by the processor, cause the processor to further carry out at least the following steps: enabling the user to present the video data with or without the first interactive video layer being turned on or off based on selection by the user to view or not view the first interactive video layer, respectively; and enabling the user to present the video data with or without the second interactive video layer being turned on or off based on selection by the user to view or not view the second interactive video layer, respectively.

Embodiment 20 is the computer readable media of embodiment 19, wherein the instructions, when executed by the processor, cause the processor to further carry out at least the following steps: displaying the video media and the first interactive video layer to the viewer; and selecting one of the selectable visual indicators by the user to display marketing information of the corresponding item, song, or service of interest to the viewer.

Embodiment 21 is the computer readable media of embodiment 20, wherein the instructions, when executed by the processor, cause the processor to further carry out at least the following step: purchasing the selected item, song, or service of interest from the marketing information.

Embodiment 22 is the computer readable media of embodiment 21, wherein the purchasing occurs while the video media is being displayed to the viewer.

Embodiment 23 is the computer readable media of embodiment 17, wherein the instructions, when executed by the processor, cause the processor to further carry out at least the following step: of copying a timed portion of the video data to a clip list based on a selection of an item, service, or song of interest by the user.

Embodiment 24 is the computer readable media of embodiment 17, wherein the instructions, when executed by the processor, cause the processor to further carry out at least the following step: collecting data based on actions taken by the user.

Embodiment 25 is the computer readable media of embodiment 17, wherein the instructions, when executed by the processor, cause the processor to further carry out at least the following steps: removing the product information from the one or more of the plurality of objects; and associating different product information with the one or more of the plurality of objects.

Embodiment 26 is the computer readable media of embodiment 17, wherein the instructions, when executed by the processor, cause the processor to further carry out at least the following step: providing a third interactive video layer having one or more visual indicators to the server for distribution with the video media to the viewer.

Embodiment 27 is the computer readable media of embodiment 26, wherein the one or more visual indicators include a link for one or more of a second video media, a side room digital layer, a promotional video, a game, and/or merchandise.

Embodiment 28 is the computer readable media of embodiment 17, wherein generating the video data includes the third interactive video layer.

Embodiment 29 is the computer readable media of embodiment 17, wherein the video media includes one of a television episode or a movie.

Embodiment 30 is the computer readable media of embodiment 17, wherein identifying one or more of the plurality of visual or audio objects is performed manually through the input of spatial and/or temporal data for each item, song, or service within the video media.

Embodiment 31 is the computer readable media of embodiment 17, wherein identifying one or more of the plurality of visual or audio objects is performed automatically by a computer program for visual and/or audio recognition and mapping.

Embodiment 32 is the computer readable media of embodiment 17, wherein the first and second interactive layers are unaffected by ad blocking software.

Embodiment 33 is a computer-implemented system comprising: a digital processing device comprising: at least one processor, an operating system configured to perform executable instructions, a memory, and a computer program including instructions executable by the digital processing device to create an application for providing information on items, services, or songs in a video media, the application comprising:
 a) a software module for receiving a request for the generation of information regarding items, services, or songs presented in a video media from a user's processing device;
 b) a software module for linking items, services, or songs identified manually or automatically with marketing and/or purchasing information;
 c) a software module for the generation of a first interactive layer to display with the video media, wherein said first interactive layer contains items, services, or songs of interest linked to marketing and/or purchasing information;
 d) a software module for the generation of a second interactive layer to display with the video media and optionally the first interactive layer; wherein the second interactive layer contains a social media portion for the user to interact with at least one guest; and
 e) a software module for transmitting the first and second interactive layers to the user's processing device.

Embodiment 34 is the system of embodiment 33, wherein the application further comprises a software module for generating: a video data that includes the video media, the first interactive video layer, and the second interactive video layer; and a network for providing the video data to a user.

Embodiment 35 is the system of embodiment 34, wherein the application further comprises a software module for enabling the user to present the video data with or without the first interactive video layer being turned on or off based on selection by the user to view or not view the first interactive video layer, respectively; and a software module for enabling the user to present the video data with or without the second interactive video layer being turned on or off based on selection by the user to view or not view the second interactive video layer, respectively.

Embodiment 36 is the system of embodiment 35, wherein the application further comprises a software module for purchasing the selected item, song, or service of interest from the marketing information.

Embodiment 37 is the system of embodiment 33, wherein the application further comprises a software module for copying a timed portion of the video data to a clip list based on a selection of an item, service, or song of interest by the user.

Embodiment 38 is the system of embodiment 33, wherein the application further comprises a software module for collecting data based on actions taken by the user.

Embodiment 39 is the system of embodiment 33, wherein the application further comprises a software module for removing the product information from the one or more of the plurality of objects and associating different product information with the one or more of the plurality of objects.

Embodiment 40 is the system of embodiment 33 wherein the application further comprises a software module for providing a third interactive video layer having one or more visual indicators to the server for distribution with the video media to the viewer.

Embodiment 41 is the system of embodiment 40, wherein the one or more visual indicators include a link for one or more of a second video media, a side room digital layer, a promotional video, a game, and/or merchandise.

Embodiment 42 is the system of embodiment 33, wherein generating the video data includes a third interactive video layer.

Embodiment 43 is the system of embodiment 33, wherein the video media includes one of a television episode or a movie.

Embodiment 44 is the system of embodiment 33, wherein the application further comprises a software module for the manual identification of each item, song, or service within the video media.

Embodiment 45 is the system of embodiment 33, wherein the application further comprises a software module for the automatic identification of each item, song, or service within the video media.

Embodiment 46 is the system of embodiment 33, wherein the first and second interactive layers are unaffected by ad blocking software.

Embodiment 47 is a computer-implemented method comprising:
 a) receiving a video media having a plurality of visual or audio objects within one or more frames of the video media;
 b) processing the video media to generate a first interactive video layer, wherein the processing includes:
  i. associating product information to one or more of the plurality of visual or audio objects to correspondingly form one or more items of interest;
  ii. tracking the one or more items, services, or songs of interest through the one or more frames of the video media; and
 c) assigning a selectable visual indicator for each of the one or more items, services, or songs of interest.

Embodiment 48 is the method of embodiment 47, wherein the product information includes an image associated with the product, a product name, and a product description.

Further forms, objects, features, aspects, benefits, advantages, and embodiments of the present invention will become apparent from a detailed description and drawings provided herewith.

DETAILED DESCRIPTION OF THE INVENTION

Figure 1:
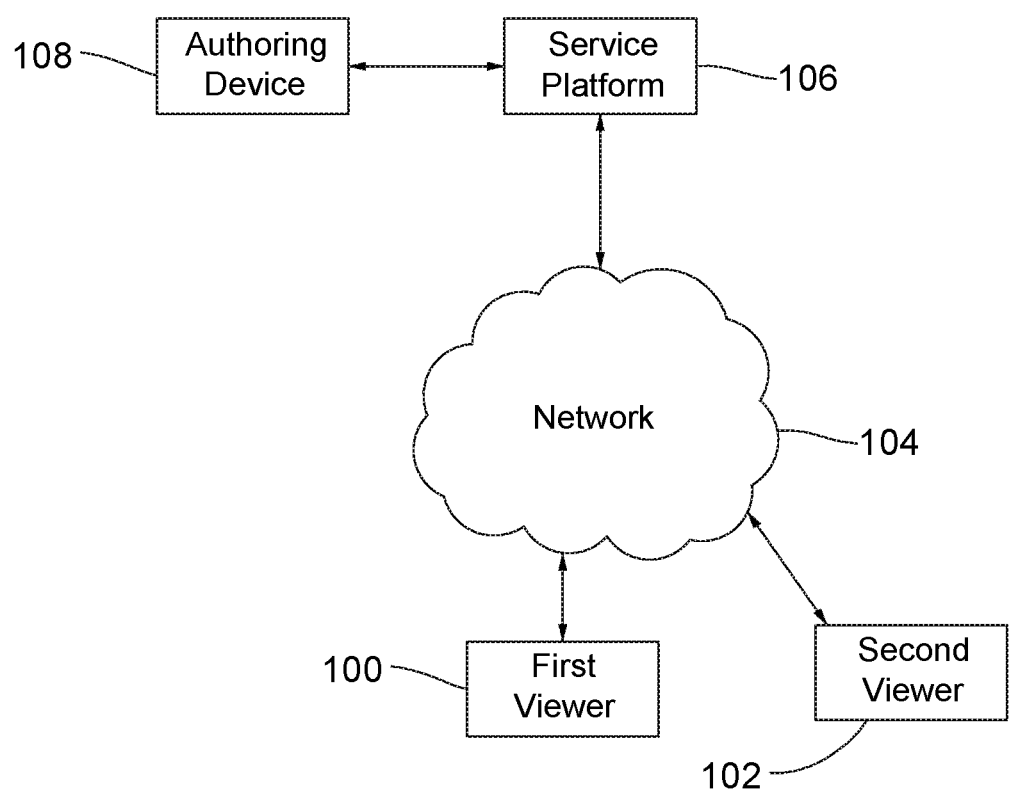
FIG. 1 illustrates a schematic block diagram of a system according to an example embodiment of the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 illustrates a generic system diagram illustrating one example (of many) that may support some example embodiments. As such, FIG. 1 illustrates an example embodiment of the present invention that includes a first media playback device 100 and a second media playback device 102 that are each capable of rendering video data. The video data that may be rendered by the media playback devices may be provided via a network 104. The video data may be provided by a variety of different types of sites such as SeeTv™ website, a customer website, or a customer website with an embedded video player, to name a few examples.

The second media playback device 102 is provided as an example to illustrate potential multiplicity with respect to other devices that may be capable of communication with the network 104. The first and second media playback devices 100 and 102 may be able to communicate with network devices or with each other via the network 104 in some situations. A service platform 106 may be connected with the network 104 and the first and second media playback devices 100 and 102 such that information can be pulled, or from which information may be pushed from the service platform 106. For example, the first and second media playback devices 100 and 102 may be enabled to communicate with the service platform 106 to provide, request, and receive information.

The first and second media playback devices 100 and 102 are interactive video players, meaning that a user can in some way interact with the video data that is being presented by the first and second media playback devices 100 and 102. An interactive video player may include some form of user interface (e.g., mouse, touch screen, joystick, voice recognition, wireless pointer, menu selection device such as a remote control or other input device) to enable user selections to be provided with respect to objects that are tracked within one of the interactive layers, to enable user interactions with other users in either a private area or public area of a second interactive layer, and to enable user interactions with other video media related activities. The first and second media playback devices 100 and 102 may be either mobile or fixed devices.

The network 104 can include various nodes, devices, or functions that are capable of communication with each other via wired or wireless interfaces. Thus the first and second media playback devices 100 and 102 can include an antenna or antennas for transmitting signals to and for receiving signals from a base site. The base site can include or be a part of a cellular or mobile network, coupled to a data network, or the Internet. Other processing devices can be coupled to the first and second media playback devices 100 and 102 via the network 104.

The service platform 106 may be a server or other processing device and may have any number of functions or associations with various services. For example, the service platform 106 may be a platform such as a dedicated server or server bank associated with a particular information source or service such as a customer website, SeeTv™ website, and/or a customer website with an embedded video player. The service platform 106 represents a potential host for a plurality of different services or information sources. The functionality of the service platform 106 is provided by hardware and/or software components configured to operate in accordance with known techniques for the provision of information to users of communication devices. Some of the functionality provided by the service platform 106 may be information provided in accordance with an example embodiment of the present invention.

The service platform 106 may collect metrics of the viewers of the first and second media playback devices 100 and 102 and any other media playback devices. For example, metrics of the viewers can include the total number of viewers watching each show, including first-time viewers and returning viewers, i.e., viewers who have seen a show and are viewing the show a second or more time. Other metrics include the duration of the video watched per user or viewer and recordation of the clicks of the viewer. The metrics of the clicks can include recording the number of objects clicked, time interval when objects are clicked, number of products purchased, number of times a video was stopped and/or started, and which interactive video layers are being turned on. These metrics can be measured according to each user for each video, total number of clicks per video, and total number of clicks per show. Additional metrics include tracking the number of times the video is shared with other viewers, number of viewers in a viewing party per video, the frequency and number of viewing parties that the viewer participates in, purchasing history, and types of items selected. Metrics may be used to identify or project at a user's preferences, a user's demographic or geographic location, products the user may want to purchase, products user's with overlapping preferences have purchased, or products for life events that the user has shown interest in (e.g. marriage, the birth of a child, home improvement items, gifts for birthdays or holidays).

An authoring device 108 may be included in the system in FIG. 1. The authoring device 108 may be configured to process video media to produce one or more interactive video layers as described below. The authoring device 108 may be configured to enable an operator to define a first interactive video layer over the corresponding video media. The authoring device 108 may include hardware and software developed to enable identification and mapping or tracking of an object or a plurality of objects such that viewers can thereafter be able to interact with.

To process video media to produce a first interactive video layer with a plurality of tracked objects, the authoring device 108 requests data such as a video object identifier, current date, and geographic location. The requested data is referenced to find associated data or product information that is valid for a first specific date range and geographic location. After the first specific date range, new or different product information or a different geographic location can be associated with the plurality of objects. After the associated data or product information is referenced, content to populate a clickable object icon view or panel on a left side of the first interactive video layer and a clickable object list view is created. Next, data is retrieved to populate the first interactive video layer when a tracked or mapped object is selected or clicked. Next, a track file is retrieved. This track file contains the mapping or tracking information which consists of a time interval (at least every half second), the location of the tracked or mapped object (x, y axis in pixels) and the size of the tracked or mapped object (width and height in pixels) and mapped object identifier. In order to accommodate various sizes of video media, the location (x, y axis in pixels) and size of the tracked or mapped object (width and height in pixels) may be defined as percentages of the largest video area available. As the video media plays, Java script functions will be called at regular intervals (at least every half second) that will look up the current mapping information and set the location and size of each clickable area. The Java script functions will also use this information to display or hide the associated clickable icon and list views and update the clickable object count of the first interactive video layer. When a tracked or mapped object is selected or clicked, a Java script function will be called using the object identifier and populate the first interactive video layer with the appropriate information to display near the tracked or mapped object. While the first interactive video layer is displayed on a viewer, if a second tracked or mapped object is clicked or selected, then the first interactive video layer will be updated with the new associated object data and repositioned, if necessary, closer to the second tracked or mapped object.

In one embodiment, product information is associated with an object, then the object is tracked or mapped. In another embodiment, the object is tracked or mapped and then the product information is associated with the tracked or mapped object. The tracked or mapped object is activated for user selection such that the object becomes an item of interest that has a corresponding selectable visual indicator or selectable title indicator. Any of a plurality of different programming languages may be used to create the first interactive video layer including selectable video objects (e.g., HTML 5, JavaScript, Angular 2.0, Cascading Style Sheets, C#, REST services, SQL, and any combination of these or other languages).

In one embodiment, an item, service, or song is identified in the video media. In one embodiment, an item, service, or song is identified manually through the input of spatial (or audio) and temporal data for each item, service, or song. In one embodiment, the spatial (or audio) and temporal data is received or inputted by the administrator. In one embodiment, the spatial and temporal data of a visual object is provided by the administrator in terms of Cartesian coordinates in each frame of the video image. In one embodiment, the audio and temporal data of an audio object is provided by the administrator in terms of the audio signal that persists through a contiguous window of time throughout the video media. In one embodiment, the administrator can identify items, services, or songs through a software module that functions as a video player that allows for the generation of object identification data. The video player contains functionalities to pause the video, play or rewind at slow, normal or fast speeds, and optionally the ability to zoom-in and zoom-out. The administrator progresses through the video and locates a visual item that is a product to be featured, and can click the item on the screen, resulting in a pause of the video. An adjustable box, circle or marker appears on the screen and is moved and resized to denote the location of the object. The administrator will then progress the video, frame by frame if necessary, and move the box, circle, or marker if the item moves throughout the images until the item is no longer visible. The administrator will then click a completion button to save the spatial and temporal data associated with the item, and the video will continue to play. In one embodiment, the spatial (or audio) and/or temporal data is inputted by the seller of the product via a software module that allows sellers to generate the object identification data.

In one embodiment, identification of each item, service, or song is performed semi-automatically with aid from a computer program. In one embodiment, identification of each item, service, or song is performed automatically by a computer program using visual or audio recognition and mapping. In one embodiment, image mapping is performed by the analysis of gradients and patterns between pixels to identify unique objects.

Disclosed herein are methods, systems, and software for providing information on items, services, or songs in a video media. The high speed at which the information is displayed following the users request allows for the application to be used during live broadcasts or with previously unprocessed video media. Computer assisted automatic identification and automatic association to purchasing or marketing information can be used to provide a mapping time for one item in one image of: less than or equal to 10 seconds, less than or equal to 5 seconds, less than or equal to 3 seconds, less than or equal to 2 seconds, less than or equal to 1 second, less than or equal to 0.90 seconds, less than or equal to 0.80 seconds, less than or equal to 0.75 seconds, less than or equal to 0.70 seconds, less than or equal to 0.65 seconds, less than or equal to 0.60 seconds, less than or equal to 0.55 seconds, less than or equal to 0.50 seconds, less than or equal to 0.45 seconds, less than or equal to 0.40 seconds, less than or equal to 0.35 seconds, less than or equal to 0.30 seconds, less than or equal to 0.25 seconds, less than or equal to 0.20 seconds, less than or equal to 0.15 seconds, less than or equal to 0.10 seconds, or less than or equal to 0.05 seconds. Mapping of multiple items may cause an increase in cumulative mapping time. In one embodiment, mapping of up to 10 items in one image is performed in less than or equal to 10 seconds, less than or equal to 5 seconds, less than or equal to 3 seconds, less than or equal to 2 seconds, less than or equal to 1 second, less than or equal to 0.90 seconds, less than or equal to 0.80 seconds, less than or equal to 0.75 seconds, less than or equal to 0.70 seconds, less than or equal to 0.65 seconds, less than or equal to 0.60 seconds, less than or equal to 0.55 seconds, less than or equal to 0.50 seconds, less than or equal to 0.45 seconds, less than or equal to 0.40 seconds, less than or equal to 0.35 seconds, less than or equal to 0.30 seconds, less than or equal to 0.25 seconds, less than or equal to 0.20 seconds, less than or equal to 0.15 seconds, less than or equal to 0.10 seconds, or less than or equal to 0.05 seconds. In one embodiment, mapping of up to 100 items in one image is performed in less than or equal to 10 seconds, less than or equal to 5 seconds, less than or equal to 3 seconds, less than or equal to 2 seconds, less than or equal to 1 second, less than or equal to 0.90 seconds, less than or equal to 0.80 seconds, less than or equal to 0.75 seconds, less than or equal to 0.70 seconds, less than or equal to 0.65 seconds, less than or equal to 0.60 seconds, less than or equal to 0.55 seconds, less than or equal to 0.50 seconds, less than or equal to 0.45 seconds, less than or equal to 0.40 seconds, less than or equal to 0.35 seconds, less than or equal to 0.30 seconds, less than or equal to 0.25 seconds, less than or equal to 0.20 seconds, less than or equal to 0.15 seconds, less than or equal to 0.10 seconds, or less than or equal to 0.05 seconds.

The authoring device 108 may be configured to produce a second interactive video layer as described below. The authoring device 108 may be configured to enable an operator to define a second interactive video layer over the corresponding video media. The authoring device 108 may include hardware and software developed to enable a session or conversation to be initiated that will require a video identification, a geographic location, a timestamp, and a user identification, and a session identification. To enable the user to invite other users to a session or conversation, the authoring device 108 requires the session identification and the user identification. For a user to post comments in the second interactive video layer, the authoring device 108 requires the session identification, the user identification, the timestamp, a public or private flag, and a comment. For the user to retrieve comments, the authoring device 108 requires the session identification, timestamp, and will display the comments in the timestamp order. Any of a plurality of different programming languages may be used to create the second interactive video layer having active sessions or conversations between users in a public or private setting (e.g., HTML 5, JavaScript, Angular 2.0, Cascading Style Sheets, C#, REST services, SQL, and any combination of these or other languages).

The authoring device 108 may be configured to produce a third interactive video layer as described below. The authoring device 108 may be configured to enable an operator to define the third interactive video layer over the corresponding video media. The authoring device 108 may include hardware and software developed to enable an interactive section that mimics or copies the environment of the video media. The third interactive video layer is a place where users can get a deeper immersion of the environment of the video media and find unique items associated with the video media to purchase and explore.

In one embodiment, in which the authoring device can display more than one item, the authoring device may be configured to use activity data to display items of interest. For example, if the authoring device may display 30 items in an image, which may serve to hinder navigation and confuse the viewer, the authoring device may select a reduced number of items to display to the user based on data collected on the user. This may include the user's past purchases, viewing history, demographic, geographic location, or inferred interests. In one embodiment, the authoring device uses icons or markers that increase the chances of drawing the viewer's attention to a particular item. In one embodiment, the unseen linked items can be accesses by selecting an additional tab or menu option. In one embodiment, a software module is provided for the user to decide the maximum number of icons or markers to be displayed.

The first, second, and third interactive video layers are specific to the current disclosure and are not meant to encompass traditional television guide layers, channel navigation layers, TV show or movie information layers, or closed captioning layers. Layers used by traditional cable providers to provide information regarding programming or show and movie information provided by online streaming services are also not mean to be encompassed by the first, second and third interactive layers described herein.

Figure 2:
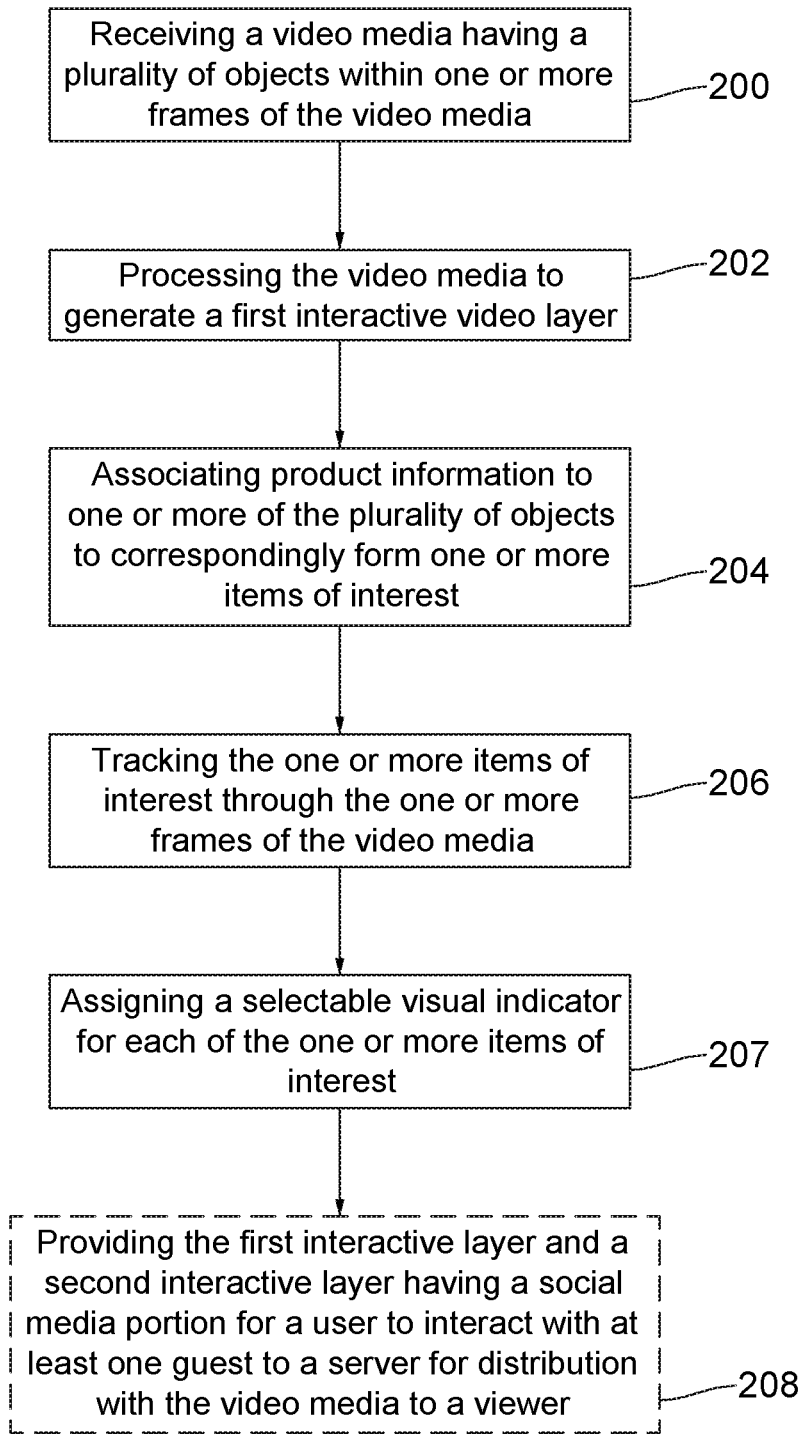
FIG. 2 is a flowchart according to an example method for generating a first interactive video layer with one or more items of interest according to an example embodiment of the present invention.
Figure 3:
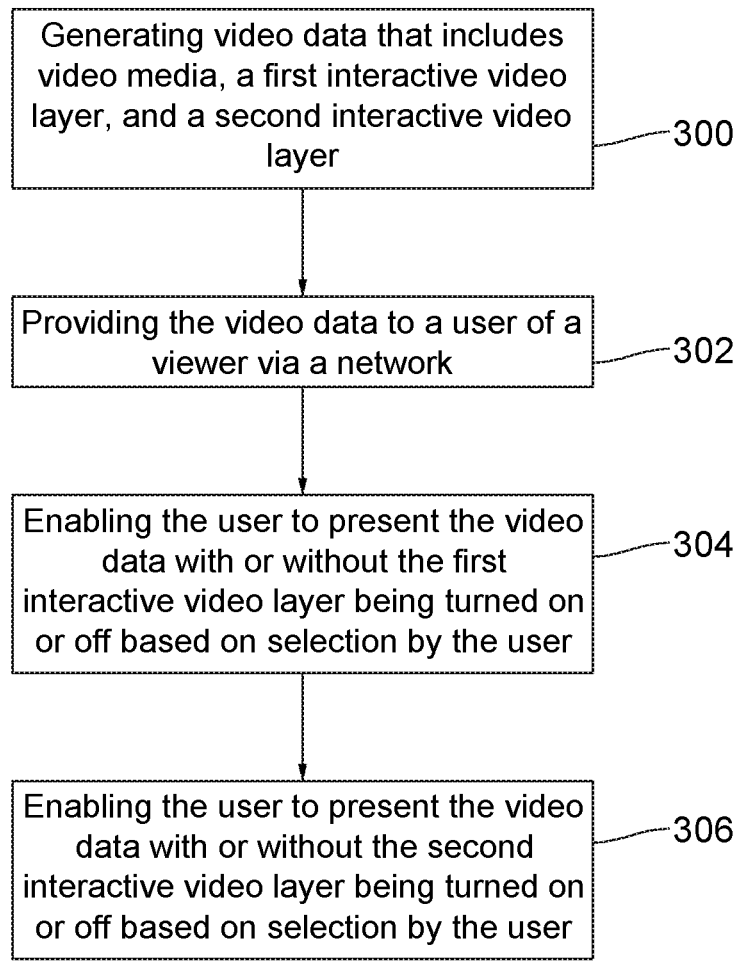
FIG. 3 is a flowchart according to an example method for generating video data that includes a first interactive video layer and a second interactive video layer according to an example embodiment of the present invention.

FIGS. 2 and 3 are flowcharts of a method and program product according to two example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal or network device and executed by a processor in the user terminal or network device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowcharts block(s). These computer program instructions may also be stored in a computer-readable memory that may direct a computer or other programmable apparatus to function in a particular manner, such that the instructions stored in the computer-readable memory produce an article of manufacture which implements the functions specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In this regard, a method according to one embodiment of the invention from the perspective of a device such as the authoring device 108, as shown in FIGS. 1 and 2, may include receiving video media having a plurality of objects within one or more frames of the video media at operation 200, and processing the video media to generate a first interactive video layer at operation 202. The processing includes associating product information to one or more of the plurality of objects to correspondingly form one or more items of interest at operation 204. The processing may include tracking the one or more items of interest through the one or more frames of the video media at operation 206 and assigning a selectable visual indicator for each of the one or more items of interest at operation 207. The method may include providing the first interactive layer and a second interactive layer having a social media portion for a user to interact with at least one guest to a server for distribution with the video media to a viewer at operation 208.

In some embodiments, certain ones of the operations above may be modified or further amplified as described below. Moreover, in some embodiments additional optional operations may also be included (operation 208 in dashed lines in FIG. 2). It should be appreciated that each of the modifications, optional additions or amplifications may be included with the operations above or below either alone or in combination with any others among the features described herein.

In an example embodiment, an apparatus for performing the method of FIG. 2 may comprise a processor configured to perform some or each of the operations 200-208 described above. The processor may, for example, be configured to perform the operations 200-208 by performing hardware implemented logical functions, executing stored instructions, or executing algorithms for performing each of the operations.

A method according to one embodiment of the invention from the perspective of the service platform 106 and authoring device 108 is shown in FIG. 3, and may include generating video data that includes the first interactive video layer and a second interactive video layer at operation 300. The method may include providing the video data to a user of a viewer through the network 104 at operation 302. The method may include enabling the user to present the video data with or without the first interactive video layer being turned on or off based on the selection by the user at operation 304. The first interactive video layer may include one or more items tracked through one or more frames of the video media. A selectable visual indicator is assigned for each of the items of interest that is tracked. The selectable visual indicator may be selectable from the first interactive video layer during rendering of the video media responsive to the interactive video layer being turned on, where the selectable video object has a corresponding object function call defining an action to be performed responsive to user selection of the selectable video object. The method may include enabling the user to present the video data with or without the second interactive video layer being turned on or off based on the selection by the user at operation 306.

It should be appreciated that each of the modifications, optional additions or amplifications may be included with the operations above either alone or in combination with any others among the features described herein. In this regard, in some embodiments the method may further include displaying a selectable visual indicator proximate to the item of interest at operation 207. The object selection marker may provide a visual indication of a presence of the selectable video object on a display rendering the video data. Some markers may be invisible to the viewer but still mapped to a video object or allow a function call when selected. In some cases, receiving the video media may include receiving the video media from a service platform configured to provide network based distribution to a viewer or from a media storage device storing the video data. The media storage device may include, for example, a digital video disc or a BLU-RAY® disc.

In an example embodiment, an apparatus for performing the method of FIG. 3 above may comprise a processor configured to perform some or each of the operations (300-306) described above. The processor may, for example, be configured to perform the operations (300-306) by performing hardware implemented logical functions, executing stored instructions, or executing algorithms for performing each of the operations.

Figure 4:
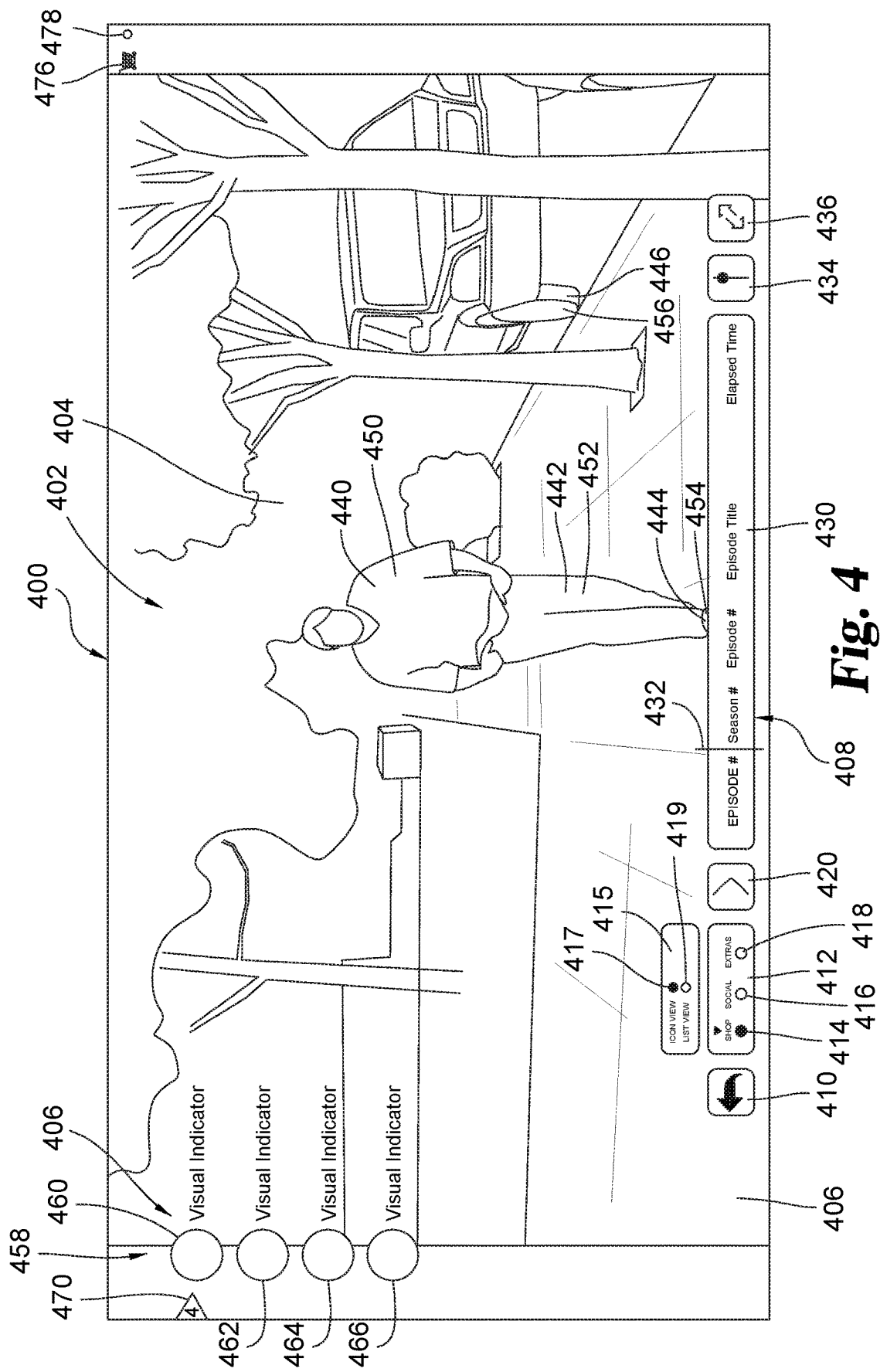
FIG. 4 illustrates the first interactive video layer with the icon view toggle on and viewable on a viewer according to an example embodiment of the present invention.

FIG. 4 illustrates an example embodiment of a screen of a viewer 400 where video data 402 may be provided on-demand. The video data 402 includes a video media 404 and a first interactive video layer 406 that is turned on in the illustrated embodiment. The first interactive video layer 406 can be turned off. The video data 402 also includes a second interactive video layer that can be turned on or off (the second interactive video layer is off; therefore it is not illustrated in FIG. 4). The video data 402 includes a third interactive video layer that can be turned on or off (the third interactive video layer is off; therefore it is not illustrated in FIG. 4). The video data 402 includes a menu bar 408 that includes controls for items that are seen in a viewing area of the screen of the viewer 400. The menu bar 408 includes a back button 410 that enables the user to return to the previous command if clicked or selected. The menu bar 408 includes a layer control section 412 that enables the user to select which one of the first interactive video layer 406, the second interactive video layer, and the third interactive video layer to view. The layer control section 412 includes a first toggle 414 that when selected turns the first interactive video layer 406 on. The menu bar 408 includes a sub-menu section 415 that includes an icon view toggle 417 and a list view toggle 419 that are displayed when the first toggle 414 is selected. If the first toggle 414 is selected, the user may select either the icon view toggle 417 (FIG. 4) or the list view toggle 419 (FIG. 5) which will be described in more detail below. The layer control section 412 includes a second toggle 416 that when selected turns the second interactive video layer on. The layer control section 412 includes a third toggle 418 that when selected turns the third interactive video layer on. The menu bar 408 includes a play button 420 that when selected causes the video media 404 to play. When the play button 420 is not selected, the video media 404 is paused and does not play. The menu bar 408 includes a video media information area 430 that includes information about the video media 404 such as a title, subtitle, season, episode, total time length of video media 404, a timer to indicate the interval being played, and other information that is relevant to the video media 404. The menu bar 408 includes a progress bar 432 that visually identifies the time interval that is being played in the video media 404. The progress bar 432 can be moved or positioned to play at specific time intervals. In another embodiment, when the progress bar 432 is repositioned or moved from a first time interval to a second time interval, a thumbnail or smaller image of a frame or scene of the video media 404 and a total number of the items of interest in the corresponding frame or scene is displayed. The menu bar 408 includes a volume control 434 for controlling or changing the volume of the video media 404 while watching the video media 404. The menu bar 408 includes a screen toggle control 436 that controls the size of the video media 404 that is displayed on the screen of the viewer 400.

Figure 6:
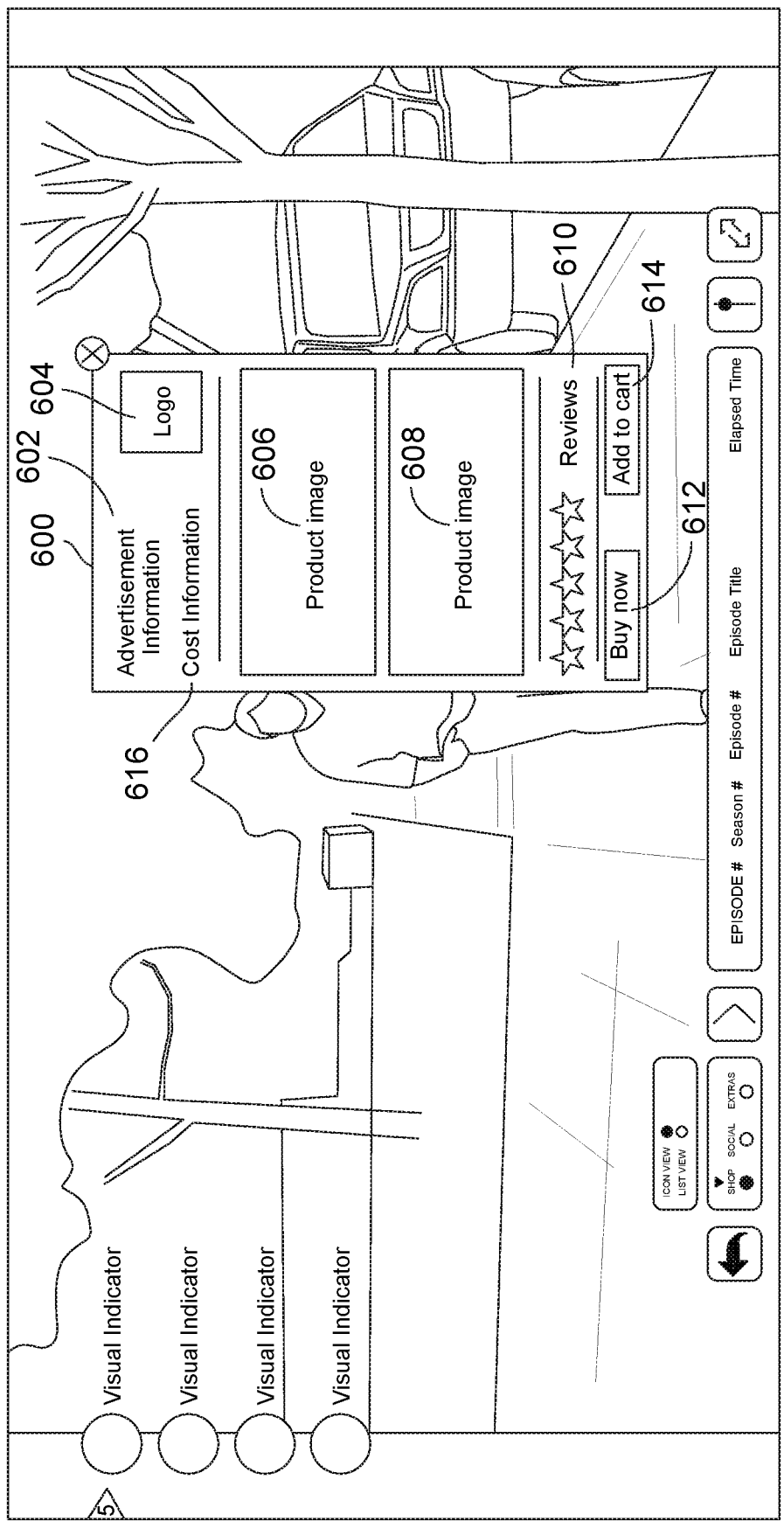
FIG. 6 illustrates the first interactive video layer with a marketing information area viewable on a viewer according to an example embodiment of the present invention.

The first interactive video layer 406 is the same size as the video media 404 when displayed on the viewer 400 in the illustrated embodiment. In other embodiments, the first interactive video layer 406 is a different size than the video media 404. The first interactive video layer 406 includes a first tracked object 440, a second tracked object 442, a third tracked object 444, and a fourth tracked object 446. Other embodiments of the first interactive video layer 406 may include more or fewer tracked objects. The first tracked object 440 is associated with specific product information to correspondingly form a first item of interest 450. The second tracked object 442 is associated with specific product information to correspondingly form a second item of interest 452. The third tracked object 444 is associated with specific product information to correspondingly form a third item of interest 454. The fourth tracked object 446 is associated with specific product information to correspondingly form a fourth item of interest 456. For example, in the illustrated embodiment, the first tracked object 440 is associated with specific product information of a shirt to form the first item of interest 450. The second tracked object 442 is associated with specific product information of a pair of pants to form the second item of interest 452. The third tracked object 444 is associated with specific product information of a pair of shoes to form the third item of interest 454. The fourth tracked object 446 is associated with specific product information of a car to form the fourth item of interest 456. The first tracked object 440, the second tracked object 442, the third tracked object 444, and the fourth tracked object 446 are tracked or mapped through the one or more frames of the video media 404. During viewing of the first interactive video layer 406 and the video media 404, the user can mouse over the first tracked object 440 or another one of the tracked objects 442, 444, or 446, and the pointer can change to a hand. When the user clicks on the first tracked object 440, the video media 404 will stop playing and a marketing panel 600 will display over a portion of the video media 404 as illustrated in FIG. 6.

The first interactive video layer 406 includes a clickable object icon view 458 that contains selectable visual indicators for the items of interest. For example, the first interactive video layer 406 includes a first selectable visual indicator 460, a second selectable visual indicator 462, a third selectable visual indicator 464, and a fourth selectable visual indicator 466 as illustrated in FIG. 4. In other embodiments, the clickable object icon view 458 may contain more or less selectable visual indicators. The clickable object icon view 458 is viewable when the user selects the icon view toggle 417. The first selectable visual indicator 460 for the first item of interest 450 enables the user to click or select the first selectable visual indicator 460 to display marketing information for the first item of interest 450, described in more detail below. The first selectable visual indicator 460 can be a related icon and/or name of the first item of interest 450. The second selectable visual indicator 462 for the second item of interest 452 enables the user to click or select the second selectable visual indicator 460 to display marketing information for the second item of interest 452. The second selectable visual indicator 462 can be a related icon and/or name of the second item of interest 452. The third selectable visual indicator 464 for the third item of interest 454 enables the user to click or select the third selectable visual indicator 464 to display marketing information for the third item of interest 454. The third selectable visual indicator 464 can be a related icon and/or name of the third item of interest 454. The fourth selectable visual indicator 466 for the fourth item of interest 456 enables the user to click or select the fourth selectable visual indicator 466 to display marketing information for the fourth item of interest 456. The fourth selectable visual indicator 466 can be a related icon and/or name of the fourth item of interest 456. As the video media 404 plays, the clickable object icon view 458 displays the corresponding selectable visual indicator(s) that have an object identification, i.e., the location (x, y axis in pixels) and size of the tracked or mapped object (width and height in pixels), for that particular time interval and frame of the video media 404.

The first interactive video layer 406 includes a clickable object counter 470 that displays the total number of items of interest that include the first item of interest 450, the second item of interest 452, the third item of interest 454, and the fourth item of interest 456 that correspond to that frame of the video media 404 in which these items of interest are displayed. The clickable object counter 470 is viewable if the first interactive video layer 406 is turned on. In the illustrated embodiment, the clickable object counter 470 has a triangular shape but may have a different shape in other embodiments.

The first interactive video layer 406 includes a shopping cart 476 for totaling the items of interest that have been added to the shopping cart 476 as a count display 478. If the user selects or clicks on the shopping cart 476, a page that displays a list of items that were added to the shopping cart 476 is viewable on the viewer 400.

Figure 5:
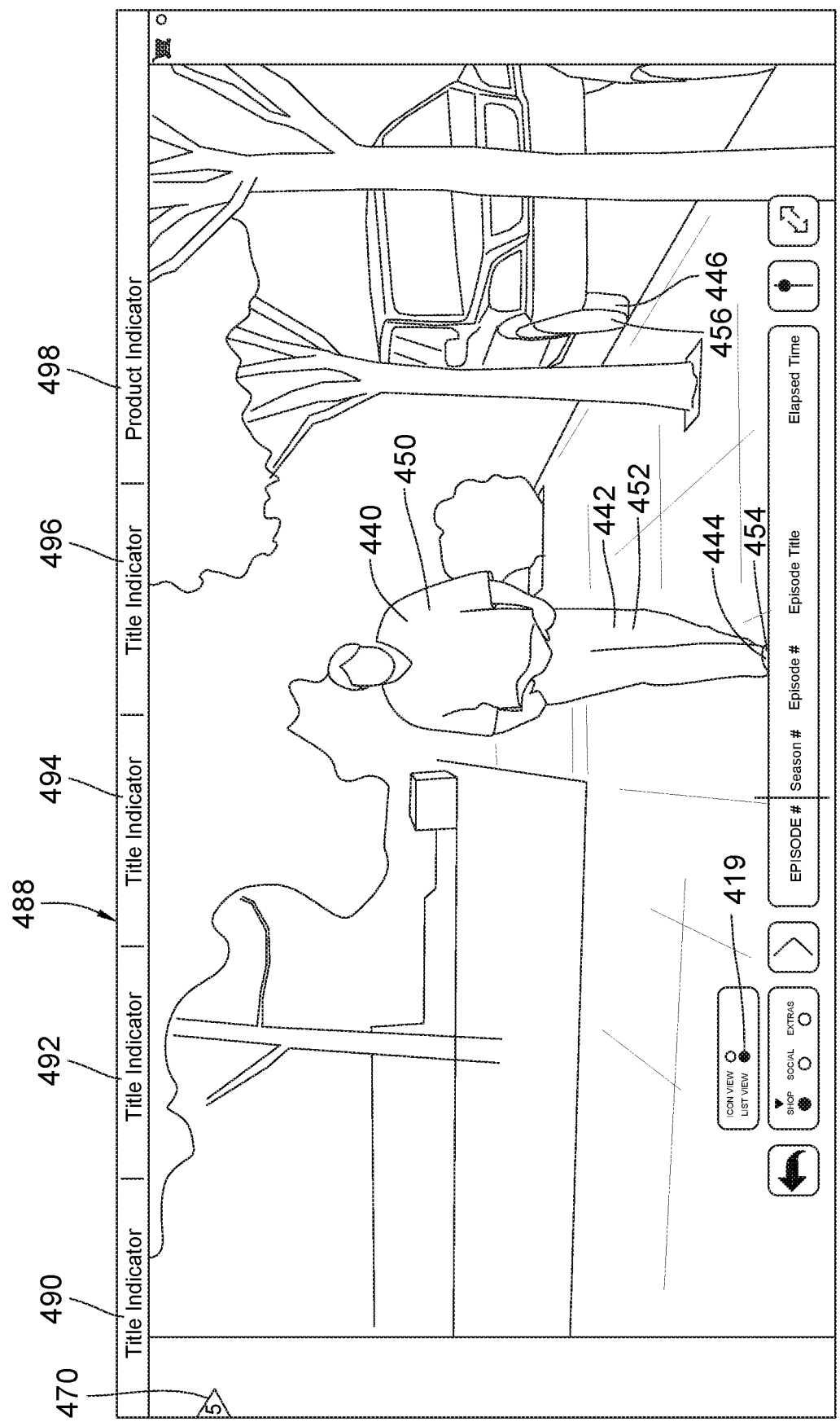
FIG. 5 illustrates the first interactive video layer with the list view toggle on and viewable on a viewer according to an example embodiment of the present invention.

The first interactive video layer 406 includes a clickable object list view 488 that is displayed on the screen of the viewer 400 as illustrated in FIG. 5. The clickable object list view 488 is viewable when the user selects the list view toggle 419. In the illustrated embodiment, the clickable object list view 488 is a narrow layer or band at the top of the screen of the viewer 400. In other forms, the clickable object list view 488 can have a different shape or location on the screen of the viewer 400. The clickable object list view 488 contains all selectable title indicators for the visual media 404; however, only the selectable title indicators that have an object identification that corresponds to the particular frame of the video media 404 or time interval are displayed on the viewer 400 as the video media 404 plays. For example, the first interactive video layer 406 includes a first selectable title indicator 490, a second selectable title indicator 492, a third selectable title indicator 494, and a fourth selectable title indicator 496 as illustrated in FIG. 5. In a different frame of the video media 404, the first interactive video layer 406 may have more or fewer selectable title indicators displayed. The first selectable title indicator 490 for the first item of interest 450 enables the user to click or select the first selectable title indicator 490 to display marketing information for the first item of interest 450. The first selectable title indicator 490 can be a name or title of the first item of interest 450. The second selectable title indicator 492 for the second item of interest 452 enables the user to click or select the second selectable title indicator 492 to display marketing information for the second item of interest 452. The second selectable title indicator 492 can be a title or name of the second item of interest 452. The third selectable title indicator 494 for the third item of interest 454 enables the user to click or select the third selectable title indicator 494 to display marketing information for the third item of interest 454. The third selectable title indicator 494 can be a related icon and/or title of the third item of interest 454. The fourth selectable title indicator 496 for the fourth item of interest 456 enables the user to click or select the fourth selectable title indicator 496 to display marketing information for the fourth item of interest 456. The fourth selectable title indicator 496 can be a related icon and/or title of the fourth item of interest 456. The first interactive video layer 406 includes a product indicator 498 that displays the name of the product. The product indicator 498 can be associated with a mapped object or the product indicator 498 can be an advertisement for a product or service that is not mapped to any objects.

After the user selects any one of the first selectable visual indicator 460, second selectable visual indicator 462, third selectable visual indicator 464, fourth selectable visual indicator 466, first selectable title indicator 490, second selectable title indicator 492, third selectable title indicator 494, fourth selectable title indicator 496, or the product indicator 498, a marketing panel 600 is displayed on the viewer 400. The marketing panel 600 can include advertisement information 602, a logo 604, a first product image 606, a second product image 608, a review area 610, a buy now button 612, an add to cart button 614, and cost information 616 for the item selected. When the add to cart button 614 is selected, the item is added to the shopping cart 476 and the county display 478 increases for each item selected. When the buy now button 612 is selected, a page where the item can be purchased immediately is displayed on the viewer 400. The marketing panel 600 can include a show sponsor. The marketing panel 600 can include a find and see item that would not display in the clickable object icon view 458. The marketing panel 600 can also include trivia, links to more information about the object, and game information.

Figure 7:
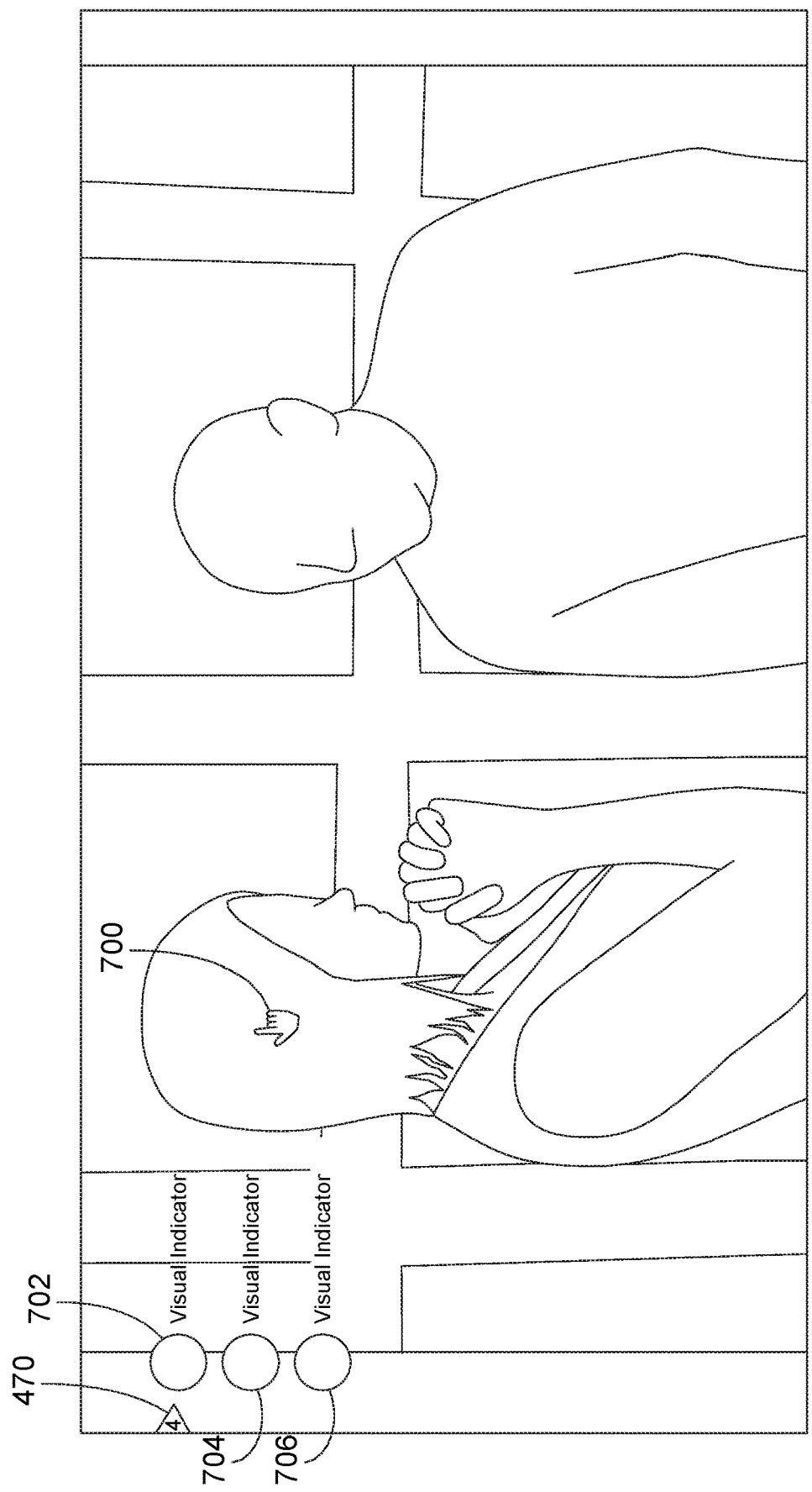
FIG. 7 illustrates the first interactive video layer with a find and see item viewable on a viewer according to an example embodiment of the present invention.

The first interactive video layer 406 includes a find and see item 700 as illustrated in FIG. 7. The find and see item 700 is an interactive game within the first interactive video layer 406. The find and see item 700 is not viewable to the user; instead, the clickable object counter 470 will display the total number of items of interest and any additional items for the find and see item 700. For example, in FIG. 7, there are three items of interest as illustrated by a fifth visual indicator 702, a sixth visual indicator 704, and a seventh visual indicator 706 and one find and see item 700 for a total of four items that are displayed in the clickable object counter 470. The additional item in the clickable object counter 470 will alert the user that the find and see item 700 is available but hidden in the scene. To find or locate the find and see item 700, the user must click on various items while watching the video media 404. The find and see item 700 can be goods or services seen in the video media 404, rewards, bonuses, or advertisements for other goods or services not seen in the video media 404. In other embodiments, there are more or fewer find and see items 700. The find and see item 700 can be changed to a different item of interest as desired by advertisers.

In one embodiment, the first interactive video layer 406 includes a clip list (not illustrated). The user can copy a portion or selection of the video media 404 or video data 402 to a clip list. The clip list saves a timed portion, such as 10, 15, or 30 seconds, of the video media 404. Users can send the clip list to other users, friends, or persons, for these viewers to watch the clip list on their device and see the item in action in the context of the video media 404. The service platform 106 can gain viewers who become interested in the video media 404. Advertisers can sell more products from the additional exposure of the clip list when more users see their products in the clip list.

In another embodiment, when the first interactive video layer 406 is turned on, viewers will be able to download music from the service platform 106. The music will be available in many formats, including but not limited to, MP3 format or stored in the cloud. Viewers can click the viewer 400 when music is playing in the background of a scene of the video media 404 and purchase the music by placing the item in the shopping cart 476 and checking out.

Figure 8:
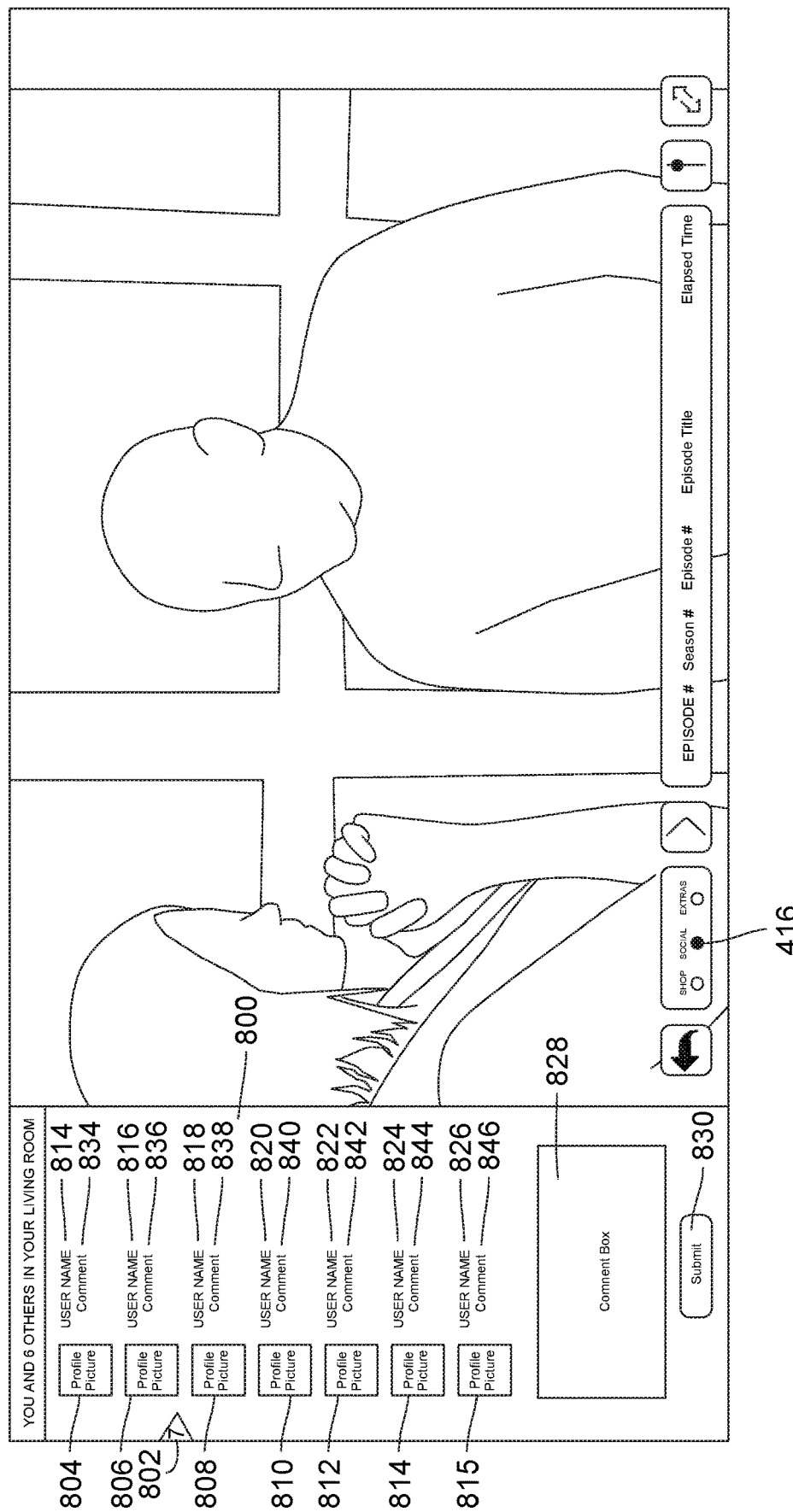
FIG. 8 illustrates the second interactive video layer viewable on a viewer according to an example embodiment of the present invention.

When the second toggle 416 is selected, a second interactive video layer 800 is turned on and viewable on the viewer 400 as illustrated in FIG. 8. The second interactive video layer 800 enables the user to invite other users to join a conversation while watching the show. The second interactive video layer 800 also enables the user to join a conversation that they have been invited to. The second interactive video layer 800 has a smaller size than the video media 404 when displayed on the viewer 400 in the illustrated embodiment. As such, while the video media 404 plays the viewer can watch the video media 404 and communicate with other viewers that have joined the conversation without having to use a second device. Optionally, the video media 404 can be resized to enable viewing of the video media 404 and the second interactive video layer 800 simultaneously. The second interactive video layer 800 includes a user count 802 that displays all of the users that are active and have joined the conversation in the second interactive video layer 800. The user count 802 has a triangular shape but in other embodiments may be shaped differently. The second interactive video layer 800 includes a friends and family button (not illustrated) that will enable the user to invite other users they know personally to join a conversation while watching the video media 404. As such, the friends and family button would enable a private conversation between the user and their personal friends and family such that only those viewers can see the comments of each other. The second interactive video layer 800 can show a list of invitations to other users wherein these invitations can be accepted or declined. The second interactive video layer 800 includes a viewing party button (not illustrated) that will enable the user to join a conversation with anyone watching the video media 404. As such, the viewing party button would enable a public conversation between the user and anyone watching the video media 404 that has joined the public conversation.

The second interactive video layer 800 includes a picture profile image associated with a username and comment for each viewer that has joined the conversation. For example, in FIG. 8 the second interactive video layer 800 has seven unique viewers who have joined the conversation; therefore each viewer has a picture profile image, a username, and their most recent comment listed below their username. In this embodiment, the second interactive video layer 800 includes a first picture profile image 804 associated with a first username 814 and a first comment 834 for the first viewer, a second picture profile image 806 associated with a second username 816 and a second comment 836 for the second viewer, a third picture profile image 808 associated with a third username 818 and a third comment 838 for the third viewer, a fourth picture profile image 810 associated with a fourth username 820 and a fourth comment 840 for the fourth viewer, a fifth picture profile image 812 associated with a fifth username 822 and a fifth comment 842 for the fifth viewer, a sixth picture profile image 815 associated with a sixth username 824 and a sixth comment 844 for the sixth viewer, and a seventh picture profile image 816 associated with a seventh username 826 and a seventh comment 846. In other embodiments, the second interactive video layer 800 includes more or fewer viewers and a corresponding picture profile image, username, and comment. The second interactive video layer 800 includes a comment box 828 in which any of the viewers that are represented by the username can enter a comment. The second interactive video layer 800 includes a submit button 830 in which the user can click to upload their comments with their username and picture profile image. The second interactive video layer 800 can include an add button to enable a user to add more viewers to the conversation by sending these viewers invitations to join the conversation and watch the video media 404. Optionally, the second interactive video layer 800 includes email or other calendar notifications of the start time of the conversation or the video media 404. The second interactive video layer 800 can enable the viewer to mark their comment private or public, and include hashtags as desired.

The second interactive video layer 800 enables a viewer to share content links, purchases and comments to the viewer's social group within the second interactive video layer 800. The second interactive video layer 800 enables a viewer to share content links, purchases and comments to outside social media platforms as well. Optionally the second interactive video layer 800 can include a share button (not illustrated) that will utilize major social media API's and be available on each purchase page, show page, episode page and living room thus allowing users to alert their outside social media followers to their activity on the second interactive video layer 800. Users can utilize a standard message or create their own.

Figure 9:
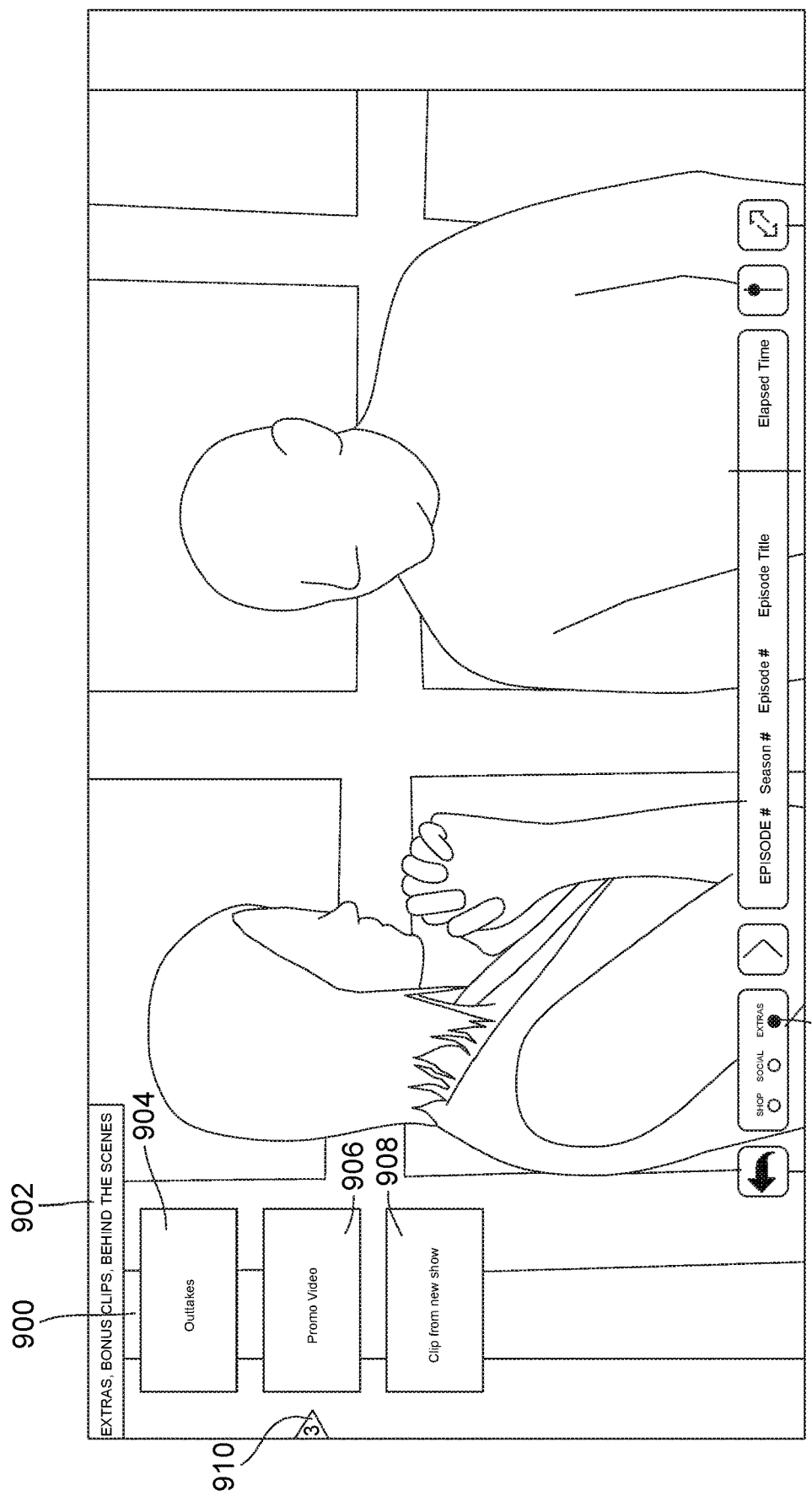
FIG. 9 illustrates a third interactive video layer viewable on a viewer according to an example embodiment of the present invention.

When the third toggle 418 is selected, a third interactive video layer 900 is turned on and viewable on the viewer 400 as illustrated in FIG. 9. The third interactive video layer 900 enables the user to experience of deeper immersion of the environment of the video media 404 and/or to purchase and explore unique merchandise associated with the video media 404. The third interactive video layer 900 has a smaller size than the video media 404 when displayed on the viewer 400. In the illustrated embodiment, the third interactive video layer 900 is displayed on the left side of the viewer 400. The third interactive video layer 900 includes a title 902 at the top. The third interactive video layer 900 also includes an outtake button 904, a promo video button 906, and a clip button 908. The outtake button 904 is a video thumbnail of outtake scenes from the video media 404. The promo video button 906 is a video thumbnail of promotional videos for the video media 404. The clip button 908 is a video thumbnail of clips of new shows or episodes of video media 404. In other embodiments, the third interactive video layer 900 can include additional or other types of content. Examples of other types of content include but are not limited to games, merchandise for sale, and other viewers with whom the user can talk to. The third interactive video layer 900 includes an extra item count 910 that displays the total number of extra items available which in the illustrated embodiment is three. The extra item count 910 accounts for the outtake button 904, the promo video button 906, and the clip button 908. The extra item count 910 has a triangular shape but in other embodiments may have a different shape and/or have a specific color.

Figure 10:
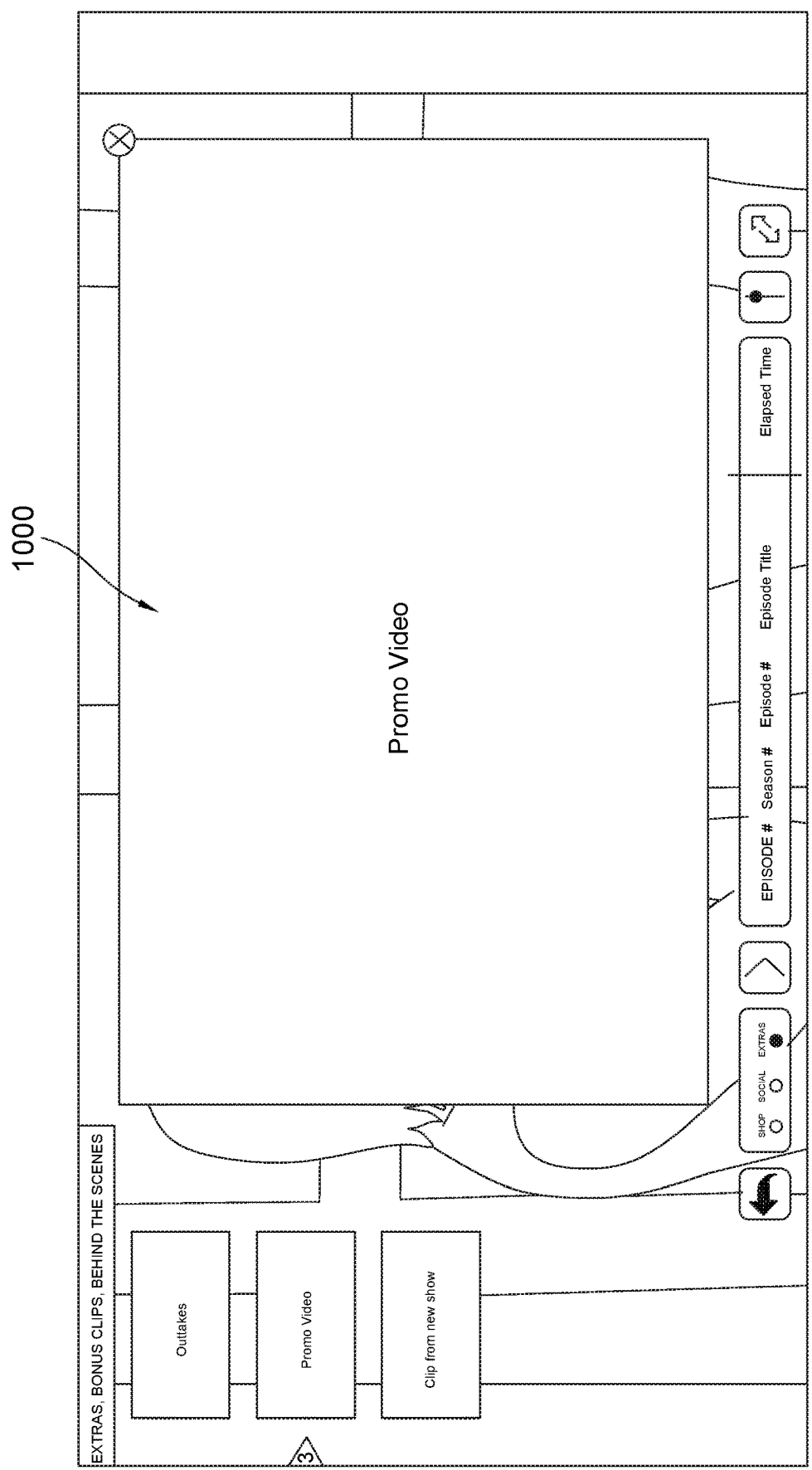
FIG. 10 illustrates the third interactive video layer wherein a promo video button is selected and a promo video is viewable on a viewer according to an example embodiment of the present invention.

When the user or viewer clicks on one of the outtake button 904, the promo video button 906, or the clip button 908, a corresponding video will display over the video media 404 as illustrated in FIG. 10. For example, if the promo video button 906 is selected then a promo video 1000 is displayed. Similarly, if the outtake button 904 is selected then an outtake video will display. If the clip button 908 is selected then a clip video will display. The promo video 1000 includes a play button that when selected causes the promo video 1000 to play. When the play button is not selected, the promo video 1000 is paused and does not play. The promo video 1000 can include information such as a title, subtitle, season, episode, elapsed playing time, total playing time of promo video 1000, volume control, and other information that is relevant to the promo video 1000. The promo video 1000 can include a screen toggle control that controls the size of the promo video 1000 that is displayed on the screen of the viewer 400. The promo video 1000 also includes an exit button to close the promo video 1000 and return to the video media 404. Beneficially, the viewer can watch the promo video 1000 without leaving the video media 404. As such, the viewer will stay on the same web browser as the video media 404 while watching the promo video 1000.

Figure 11:
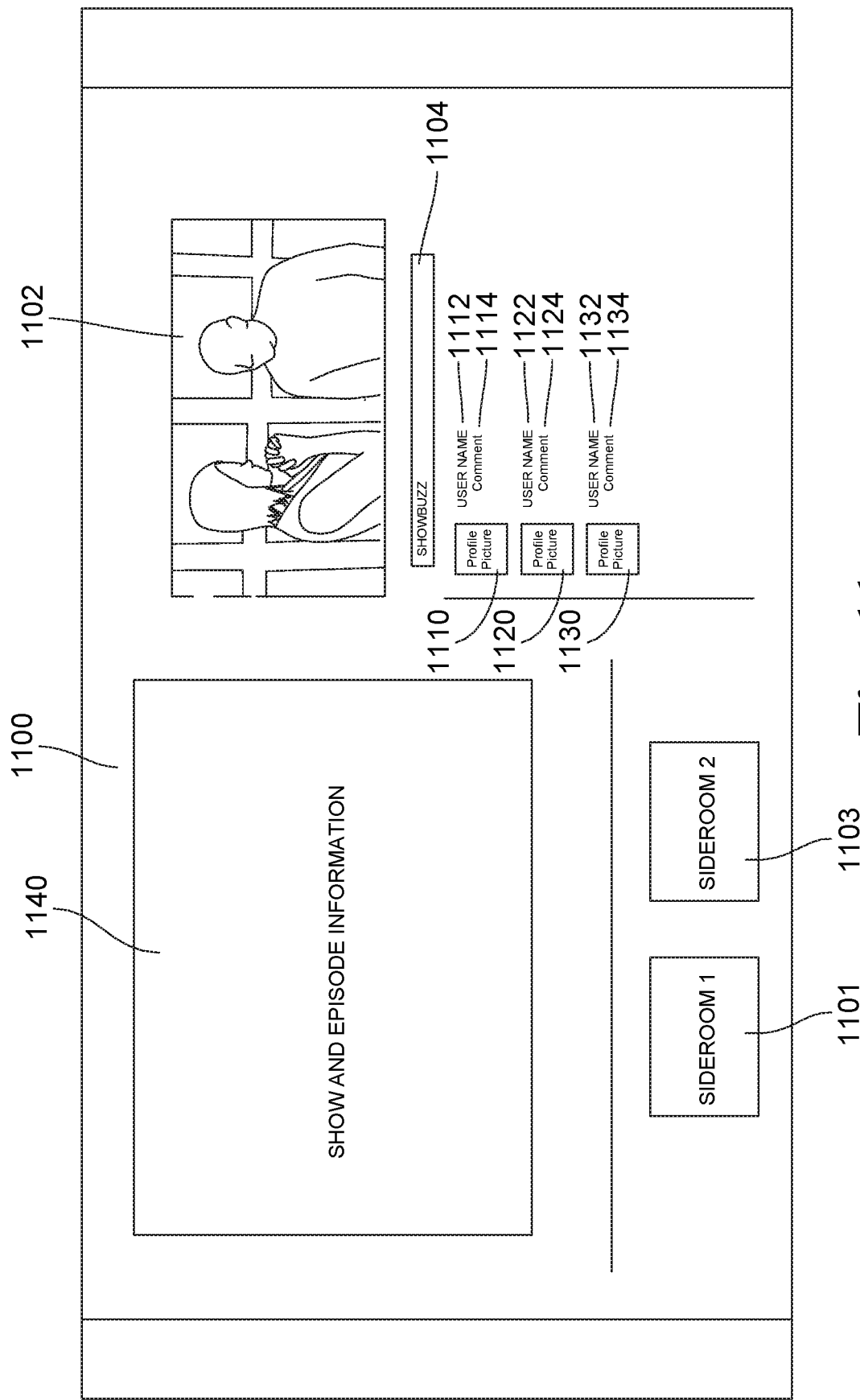
FIG. 11 illustrates a fourth interactive video layer viewable on a viewer according to an example embodiment of the present invention.

In one form, a fourth interactive video layer 1100 can be displayed with the video media 404 as illustrated in FIG. 11. The fourth interactive video layer 1100 includes a first side room 1101 and a second side room 1103 in which the user or viewer can participate in an interactive environment. The interactive environment can be themed such that it corresponds with the environment or theme of the video media 404. Alternatively, the interactive environment can have a different environment or theme than the video media 404. The first side room 1101 and the second side room 1103 can include merchandise for purchase, games, trivia, and other entertainment services. The fourth interactive video layer 1100 can also include a clip video 1102 for viewing by the user. The clip video 1102 is typically a short video related to the video media 404. The fourth interactive video layer 1100 includes a public living room 1104 in which viewers of the fourth interactive video layer 1100 can comment and interact with each other. In the illustrated embodiment, the fourth interactive video layer 1100 includes a picture profile image associated with a username and comment for each viewer that has joined the conversation. For example, in FIG. 11 the fourth interactive video layer 1100 has three unique viewers who have joined the conversation; therefore each viewer has a picture profile image, a username, and their most recent comment listed below their username. In this embodiment, the fourth interactive video layer 1100 includes a first picture profile image 1110 associated with a first username 1112 and a first comment 1114 for the first viewer, a second picture profile image 1120 associated with a second username 1122 and a second comment 1124 for the second viewer, and a third picture profile image 1130 associated with a third username 1132 and a third comment 1134 for the third viewer. The fourth interactive video layer 1100 includes an informational area 1140 that can display show and episode information, advertisements, and other information.

Figure 12:
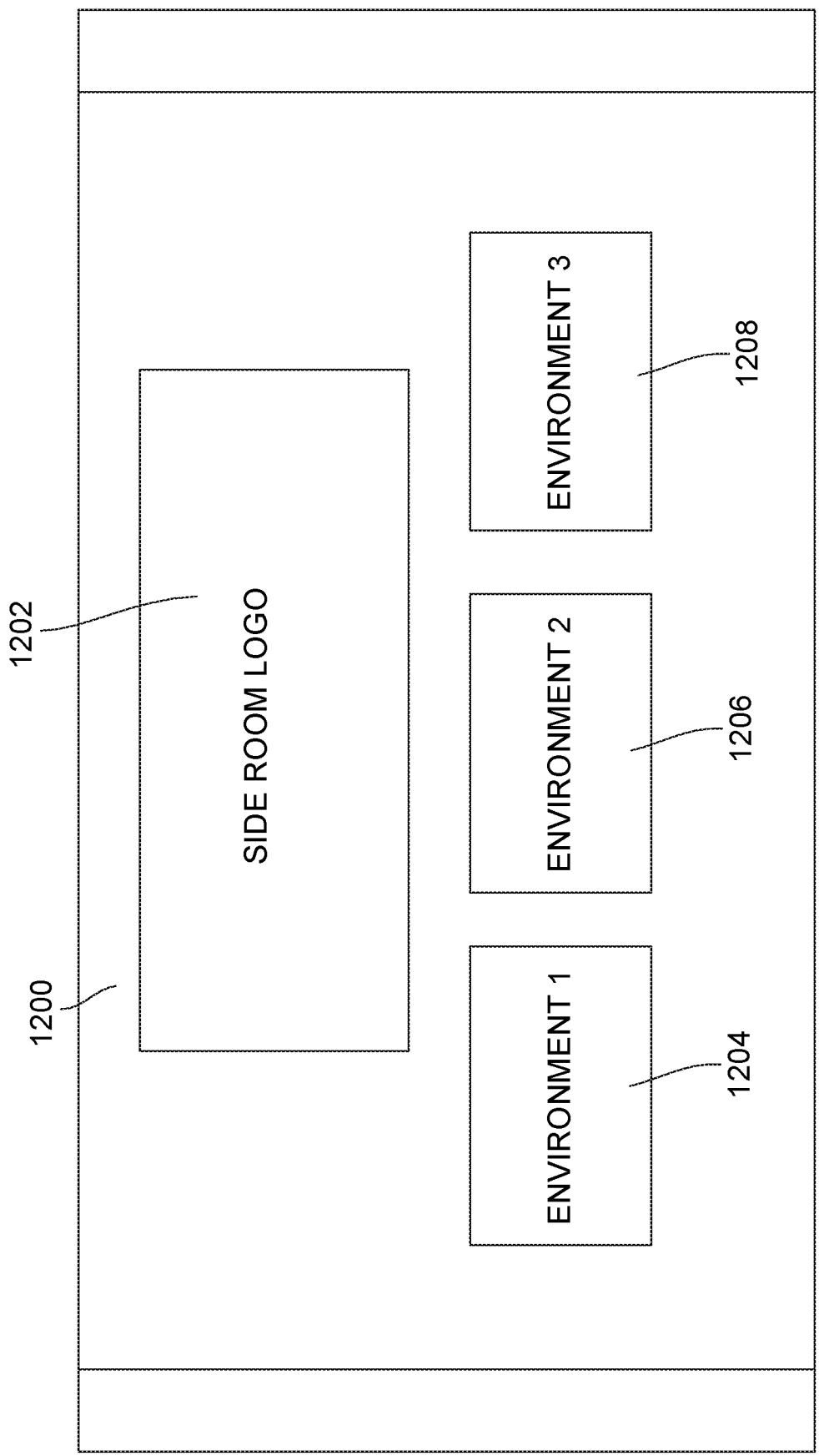
FIG. 12 illustrates a side room digital layer viewable on a viewer according to an example embodiment of the present invention.

When the viewer selects the first side room 1101, a side room digital layer 1200 is displayed over the video media 404 as illustrated in FIG. 12. The side room digital layer 1200 includes a specific area for each of an advertiser logo 1202, a first environment 1204, a second environment 1206, and a third environment 1208. The first environment 1204, the second environment 1206, and the third environment 1208 are typically based on the theme of the show or the video media 404. For example, the theme of any of the first environment 1204, the second environment 1206, and the third environment 1208 can be a bar, fantasy world, an apartment, or another setting. In other embodiments, the side room digital layer 1200 can include additional areas for logos and more or fewer environments. The viewer can select any of the first environment 1204, the second environment 1206, and the third environment 1208 and explore these environments.

Figure 13:
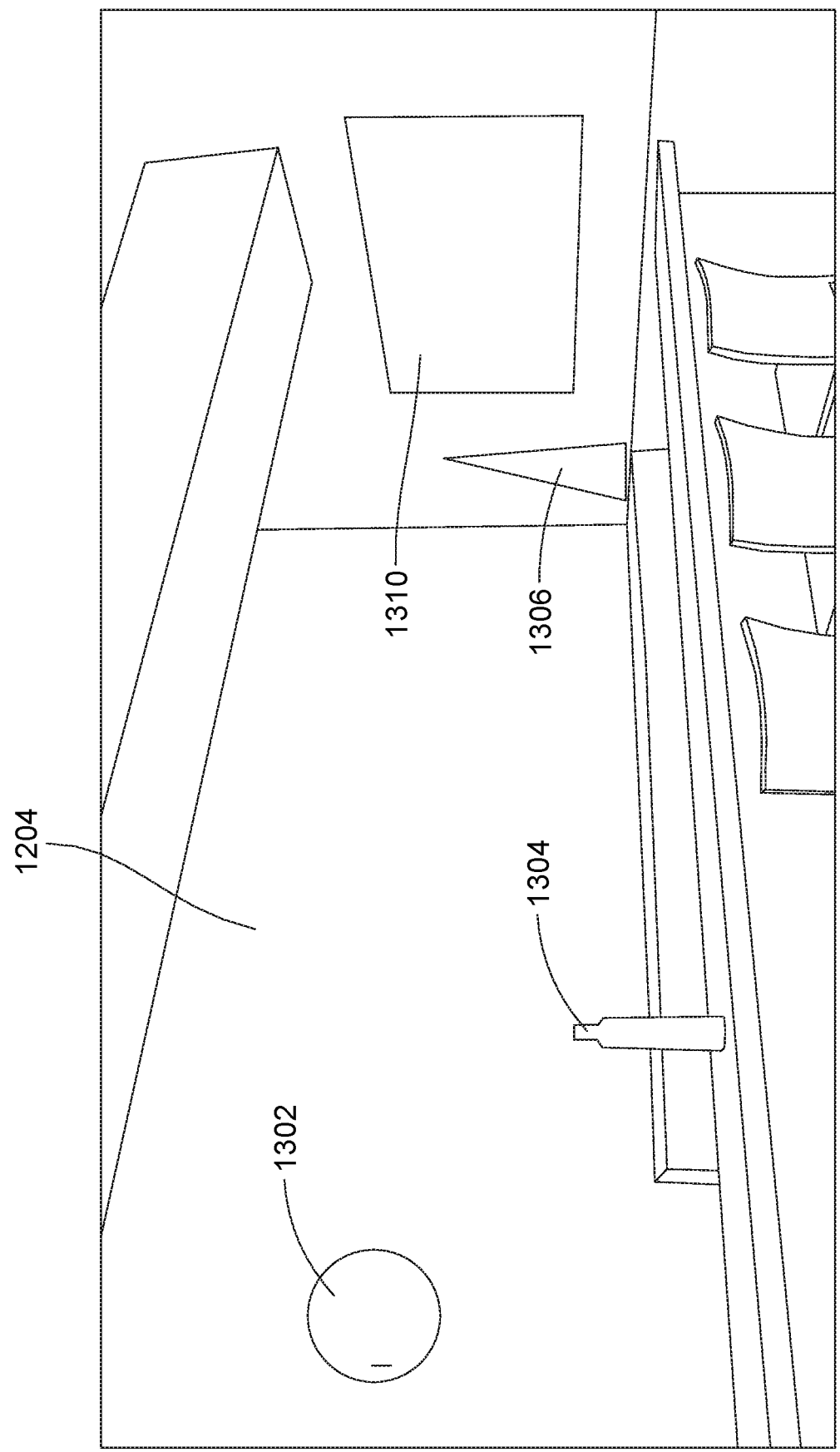
FIG. 13 illustrates a first environment of the side room digital layer illustrated in FIG. 12.

FIG. 13 illustrates the first environment 1204. The first environment 1204 can include sponsored items, advertisements, or merchandise such as a first sponsored item 1302, a second sponsored item 1304, and a third sponsored item 1306. The first sponsored item 1302, the second sponsored item 1304, and the third sponsored item 1306 are highlighted such that the viewer can quickly see which items in the first environment are selectable. Sponsors or advertisers can promote and offer for sale merchandise or services in the first environment 1204. The first environment 1204 can include a game 1310 that the viewer can select and play. Although not illustrated, the first environment 1204 can include related videos and bonus content.

Figure 14:
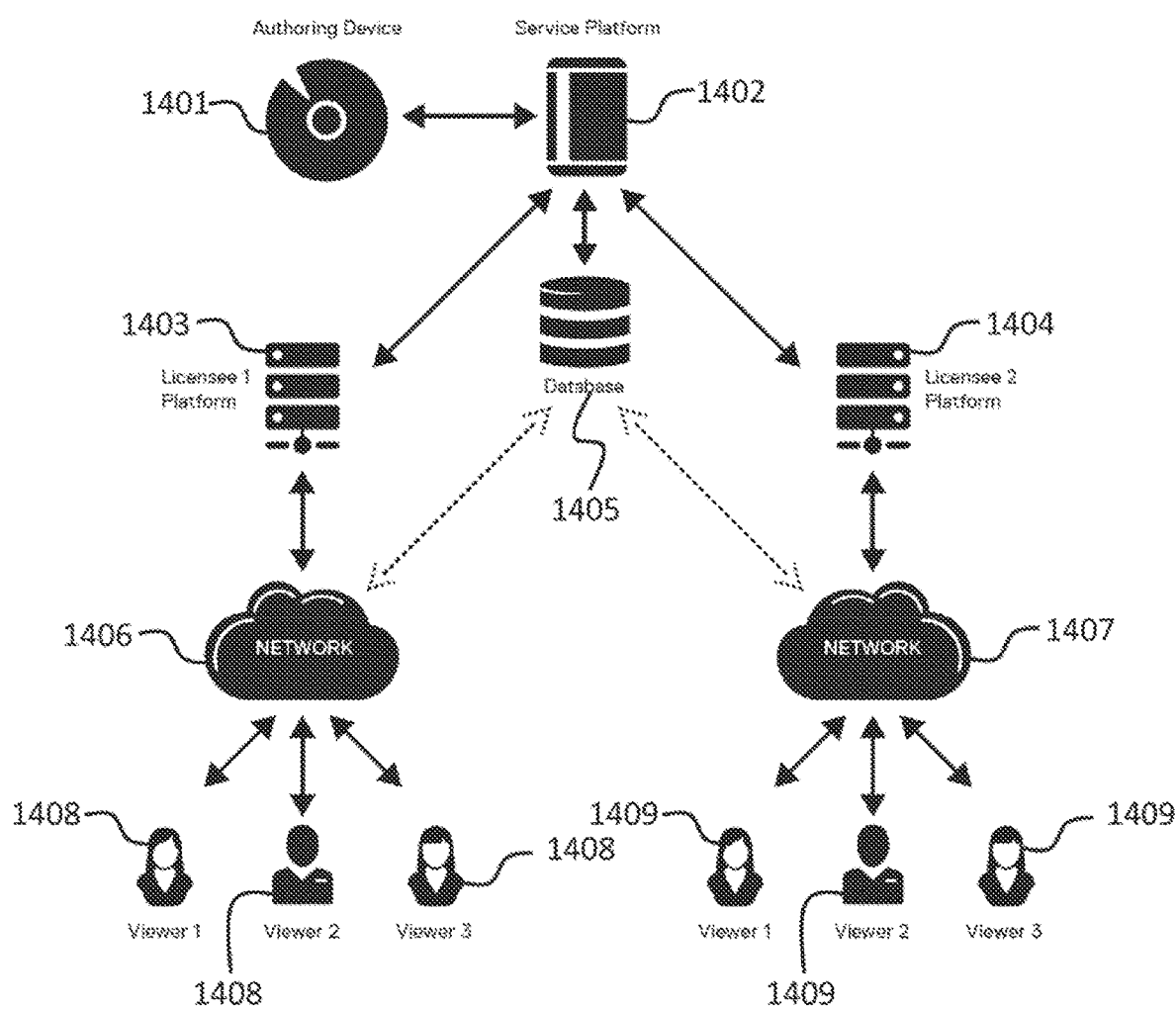
FIG. 14 illustrates the flow between the platform and the licensees.

FIG. 14 outlines the flow between the service platform 106, authoring device 108 and potential licensees. The object identification data is stored within a database 1405 and used in conjunction with the service platform 106 and authoring device 108 to generate and deliver the interactive layers to the licensee platforms 1403, 1404 and viewer networks 1406, 1407.

The service platform 1402 hosts all the database framework containing shopping layers, social media layers and extras layers. The licensee platform would host the licensee's own video media with the licensee's player, upon the first, second and optional third layers are placed via integration of a .vtt file. Viewers 1408, 1409 are then able to access the video content with interactive layers from the licensee network. As users click items in the video, a call will be sent to the service platform and database to access product info, social media and extras.

Additional Features

Current ad blocking technology identifies images and code that shares commonalities or is linked with ads being displayed. For instance, code blocks or java script associated with an advertisement often include keywords such as "ad" in order to be displayed in video media. Ad blockers are then able to identify and block the advertisement. The software, systems and methods disclosed within do not utilize code blocks or JavaScript containing key words for advertisements, but rather are associated with the items, services or songs within the video media. Any advertisement is performed by the video media with the software, systems and methods disclosed herein linking the audio and visual objects of interest to marketing and purchasing data.

The first, second, and third interactive video layers containing the spatial (or audio) and/or temporal data identifying items within the video media are loaded as a .vtt file (or a "web video tracks) containing a detailed the time frame and location of the specific items loaded into the shopping layer. A .vtt file is connected to the video via the video's "track" element. As the video loads, a series of JavaScript and jQuery functions check the tracks file for cues that are to be loaded within the specific time stamp of the video and then dynamically adds them to the appropriate elements to enable the See 'n Click functionality as well as the icon and list views on the site. When the cue ends, those items are then removed from the specific elements. The dynamic nature of loading the items into the click layer and the list and icon view layers, in combination with the updated element identifiers has the added benefit of enabling the anti ad blocking technology.

The systems, software and methods disclosed herein use a non-standard authentication mechanism that utilizes a unique approach for each user's authentication. A standard authentication utilizes a username and password combination. Typically a password that is stored is encrypted using an encryption algorithm. Many applications use a standard password salt string to further encrypt a password string combination. The password salt is a fixed combination of characters that is standard to the application and does not change. The non-standard authentication mechanism utilizes a non-standard encryption algorithm that allows for increased protection from hackers who target standard encryption algorithms. In addition, password salt strings are unique to each user rather than being a standard default string. New users are redirected to create a security question and response if the user does not have questions and responses added into their account. User security answers are treated the same as passwords and are encrypted using unique password salts for each user. For added protection, an automatic lockout feature within the authentication process can stop users from specific IP addresses from accessing the site for a specified duration if a number of subsequent failed login attempts have originated from said IP address. In some embodiments, this is 3, 4, 5, 6, 7, 8, 9, or 10 failed login attempts. In some embodiments the lockout time is greater than 5 minutes.

Within the software module designed for use by an administrator are features to manage all users. These features include: 1) the ability to view a list of all viewers using the software module; the ability to edit a specific user's information, including name, email, application security role, passwords, etc; the ability to add new users to the application; the ability to add, edit and delete existing security questions; the ability to sort and search for users using a variety of search criterion (including, but not limited to: Name, Email, User Activity, Favorite Shows, Date Ranges, etc); and the ability to lock out specific users on demand.

Within the software module designed for use by an administrator, are features to track users by logging the user's activity. The user activity tracker logs the activities of users who are watching the videos via the application. This allows for the adjustment of the timestamp of the video player when the user returns from a store that is linked from our platform. The tracker also allows for the collection of valuable data concerning the usage of our platform. These data can be used to enhance our website and add new features. These data can also be used to give advertisers, merchants, video producers and licensees more information about their product and video demand. This software, systems and methods disclosed herein allow licensees to post data to the tracking system from their own servers in order to better benefit from the data collected. Additional functionality is planned to allow for the filtering and packaging of user data within the software module designed for use by an administrator. The tracking system logs the following user activity data: when a user starts playing a video; when a user pauses a video; when a user finishes a video; when a user uses the video's progress bar to move to a different time stamp in the video; when a user enables the shopping layer; when a user disables the shopping layer; when a user clicks on an item in the shopping layer; when a user clicks on the "Buy Now" button on an item; when a user enables the social layer; when a user posts a comment in the social layer; when a user disables the social layer; and when a user enables the extras layer; when a user disables the extras layer.

Within the software module designed for use by an administrator, are features to manage what security roles are enabled for users of the service. This allows for the control of enabling the software module specific to the administrator, as opposed to a software module available to viewers, merchants, video producers, advertisers, or licensees.

Within the software module designed for use by an administrator, are features to manage actors and stars that appear in videos first, second, or third interactive layers.

These features include: the ability to add a new actor; the ability to edit an actor; the ability to view the details of an actor; the ability to enable or disable an actor in the website; and the ability to search and filter actors by various criteria (name, programs, etc). In one embodiment, the user has access to a software module that allows the user to tag actors and request information on objects or services the actor is seen interacting with in video media. Filters or search queries may be used to further navigate to an item of interest.

Within the software module designed for use by an administrator, are features to manage the first, second, or third interactive layers that overlay the programs that are available for viewing. A program could be a TV show, a movie, a documentary or more. For each TV show, movie, or documentary, the administrator can manage the following features: the ability to add a new program and choose the program type, category, rating, description, images, and more; edit existing programs; disable existing programs from being accessible to users; view the details of a specific program; add and edit seasons to a TV show or series; add and edit episodes to a TV show or series. In one embodiment, the user has access to a software module that allows the user to adjust their ratings of programs or assemble lists of the user's preferred video media.

Within the software module designed for use by an administrator, are features to manage the first, second, or third interactive layers that overlay the information regarding companies that advertising products are assigned to. For each TV show, movie, or documentary, the administrator can manage the following features: the ability to view all companies; the ability to add a new company; the ability to edit an existing company, including the ability to disable an existing company; the ability to assign specific users to a company; the ability to view advanced details for each company (products, ads, featured shows); the ability to view stats for all ads and episodes.

Within the software module designed for use by an administrator, are features to manage the first, second, or third interactive layers that overlay the information regarding the individual items that are placed on the videos in the application. The items are considered instances of products that are tied to specific companies. Items are associated with several data points. These data points include, but are not limited to: product, program, episode, start time (in milliseconds), end time (in milliseconds), X & Y Coordinates (in %), Height and Width (in %) and company data points are utilized to generate the tracks file that is loaded for users who are viewing the video. In one embodiment, one track file is generated per episode of a program. In another embodiment, demographic data is be used to dynamically generate the tracks file at the time a video is loaded by a user. For each ad, the following features are available: the ability to view all ads; the ability to edit the ad placement; the ability to enable or disable an ad; the ability to view the performance of an ad.

In one embodiment, the advertiser, merchant, company, or seller has access to a software module that allows for the input of data points utilized to identify audio and visual objects within video media. In one embodiment the licensee controls the ability of the advertiser, merchant, company, or seller to identify items within the video media. In one embodiment, an advertiser, merchant, company, or seller can pay the licensee for access to the software module used to identify audio or visual objects. In one embodiment, an advertiser, merchant, company, or seller can pay the licensee to identify audio or visual objects. In one embodiment, an advertiser, merchant, company, or seller can link an identified product to purchasing information of their choice. In one embodiment, an advertiser, merchant, company, or seller can pay for the ability to link an identified product to purchasing information of their choice.

Within the software module designed for use by an administrator, are features to manage the errors that occur within the service. These include automatically tracked and logged errors as well as any manual errors that are added programmatically by the application as a logging mechanism.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft Windows®, Apple Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile OS, Linux®, and Palm WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft Silverlight®, Java™, and Unity Mobile Application In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of source data records (and associated identifiers), accepted data records (and associated identifiers), candidate data records (and associated identifiers), qualifying data records (and associated identifiers), and event logging information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

Additional Aspects

Aspect 1 concerns a method comprising generating a video data that includes a video media, a first interactive video layer, and a second interactive video layer; providing the video data to a user of a viewer via a network; enabling the user to present the video data with or without the first interactive video layer being turned on or off based on selection by the user to view or not view the first interactive video layer, respectively, and enabling the user to present the video data with or without the second interactive video layer being turned on or off based on selection by the user to view or not view the second interactive video layer, respectively.

Aspect 2 concerns the method of any preceding aspect, further comprising receiving the video media having a plurality of objects within one or more frames of the video media; processing the video media to generate the first interactive video layer, wherein the processing includes: associating product information to one or more of the plurality of objects to correspondingly form one or more items of interest; tracking the one or more of the plurality of objects through the one or more frames of the video media; and assigning a selectable visual indicator for each of the one or more items of interest.

Aspect 3 concerns the method of any preceding aspect, further comprising displaying the selectable visual indicators for the one or more items of interest in the first interactive video layer responsive to the first interactive video layer being turned on during rendering of the video data on the viewer.

Aspect 4 concerns the method of any preceding aspect, further comprising removing the product information from the one or more of the plurality of objects; and associating different product information to the one or more of the plurality of objects.

Aspect 5 concerns the method of any preceding aspect, further comprising displaying the video media and the first interactive video layer on the viewer; and selecting one of the selectable visual indicators by the user to display marketing information of the item of interest on the viewer.

Aspect 6 concerns the method of any preceding aspect, further comprising purchasing the selected item of interest from the marketing information.

Aspect 7 concerns the method of any preceding aspect, wherein the purchasing occurs while the video media is being displayed on the viewer.

Aspect 8 concerns the method of any preceding aspect, further comprising copying a timed portion of the video data to a clip list based on selection by the user.

Aspect 9 concerns the method of any preceding aspect, wherein the second interactive video layer includes a social media portion for the user to interact with at least one guest.

Aspect 10 concerns the method of any preceding aspect, further comprising collecting data based on actions taken by the user.

Aspect 11 concerns the method of any preceding aspect, wherein the video media includes one of a television episode or a movie.

Aspect 12 concerns the method of any preceding aspect, wherein the generating the video data includes a third interactive video layer, the third interactive video layer having one or more visual indicators.

Aspect 13 concerns method of any preceding aspect, wherein the one or more visual indicators include a link for one or more of a second video media, a side room digital layer, a promotional video, a game, and/or merchandise.

Aspect 14 concerns the method of any preceding aspect comprising receiving a video media having a plurality of objects within one or more frames of the video media; processing the video media to generate a first interactive video layer, wherein the processing includes: associating product information to one or more of the plurality of objects to correspondingly form one or more items of interest; tracking the one or more items of interest through the one or more frames of the video media; and assigning a selectable visual indicator for each of the one or more items of interest.

Aspect 15 concerns the method of any preceding aspect, wherein the product information includes an image associated with the product, a product name, and a product description.

Aspect 16 concerns the method of any preceding aspect comprising receiving a video media having a plurality of objects within one or more frames of the video media; processing the video media to generate a first interactive video layer, wherein the processing includes: associating product information to one or more of the plurality of objects to correspondingly form one or more items of interest; tracking the one or more items of interest through the one or more frames of the video media; assigning a selectable visual indicator for each of the one or more items of interest; and providing both the first interactive video layer and a second interactive video layer having a social media portion for the user to interact with at least one guest to a server for distribution with the video media to a viewer.

Aspect 17 concerns the method of any preceding aspect, further comprising generating a video data that includes the video media, the first interactive video layer, and the second interactive video layer; and providing the video data to a user of a viewer via a network.

Aspect 18 concerns the method of any preceding aspect, further comprising enabling the user to present the video data with or without the first interactive video layer being turned on or off based on selection by the user to view or not view the first interactive video layer, respectively; and enabling the user to present the video data with or without the second interactive video layer being turned on or off based on selection by the user to view or not view the second interactive video layer, respectively.

Aspect 19 concerns the method of any preceding aspect, further comprising displaying the video media and the first interactive video layer on the viewer; and selecting one of the selectable visual indicators by the user to display marketing information of the corresponding item of interest on the viewer.

Aspect 20 concerns the method of any preceding aspect, further comprising purchasing the selected item of interest from the marketing information.

Aspect 21 concerns the method of any preceding aspect, wherein the purchasing occurs while the video media is being displayed on the viewer.

Aspect 22 concerns the method of any preceding aspect, further comprising copying a timed portion of the video data to a clip list based on selection by the user.

Aspect 23 concerns the method of any preceding aspect, further comprising collecting data based on actions taken by the user.

Aspect 24 concerns the method of any preceding aspect, further comprising removing the product information from the one or more of the plurality of objects; and associating different product information with the one or more of the plurality of objects.

Aspect 25 concerns the method of any preceding aspect, further comprising providing a third interactive video layer having one or more visual indicators to the server for distribution with the video media to the viewer.

Aspect 26 concerns the method of any preceding aspect, wherein the one or more visual indicators include a link for one or more of a second video media, a side room digital layer, a promotional video, a game, and/or merchandise.

Aspect 27 concerns the method of any preceding aspect, wherein the generating the video data includes the third interactive video layer.

Aspect 28 concerns the method of any preceding aspect, wherein the video media includes one of a television episode or a movie.

EXAMPLES

Example 1—Determination of an Unknown Product

A user views a TV program by streaming from an online streaming service equipped with the software application disclosed herein. The user views a show involving home improvement and is interested in purchasing a power tool being used in the show, however the user cannot identify the tool or the manufacturer and thus cannot gain the information required to purchase the tool. The user pauses the show and activates the software application. A number of markers populate the layer to denote the available product information. The user selects the marker for the power tool of interest. The user is taken to another screen where the user can examine the price of the tool from various vendors, view any linked advertisements, analyze review data, or view any other available video media featuring the tool. The user is also able to view similar products from competing manufacturers. The user activates the social media layer of the application, and asks another friend user what the friend thinks about the power tool. The friend user is able to review the video media clips of the tool and see the data available to the original user. The friend user gives the original user feedback regarding the tool. The original user selects a vendor and purchases the item. Following the purchase, the TV program resumes. The user's billing information and shipping address is stored in the users account, allowing for minimal viewing disruption. The user is able to resume watching the show with any of the interactive layers on or off.

Example 2—Finding a Wedding Dress

A recently engaged woman would like to find a wedding dress to purchase. The woman views shows related to weddings and wedding planning through an online streaming service with the software application disclosed herein enabled. Each time a wedding dress the user likes is viewed, she selects the wedding dress and saves the dress to a list of items of interest. Advertisers obtain data regarding the user's wedding interests and wedding dresses in movies and other TV shows are prioritized and presented as clickable items of interest when the application is enabled. Additional services such as catering, cake baking, tailoring, and floral designing are also prioritized and presented as clickable items throughout all viewed video media. The user saves each item of interest, and then reviews the items with close friends and family through the social media layer. Each party is able to view clips of the items, review the marketing data, and offer opinions about the objects and items of interest. The user purchases the object and services or interest.

Example 3—Organized Purchases and Live Event Purchasing

A viewer enjoys attending sporting events. While watching a sporting event on cable TV, the user enables the software application disclosed herein. The user is able to view items of interest such as tickets to upcoming games, sports memorabilia, and tailgating accessories. The user activates the social media layer and asks other friend users if they are interested in attending an upcoming game. The user purchases tickets for an upcoming game and resumes watching the sporting event. In the second half, the viewer notices a pair of shoes on an athlete that the viewer would like to purchase. As the sporting event is live, the object mapping is performed automatically and the shoes appear as mapped object with associated product information in the first interactive layer within 0.25 seconds. The shoes remain mapped while displayed in the video media.

Example 4—Dressing Like Your Favorite Star

A user finds that a particular actress has an admirable taste in clothing or similar body type to the user's own, and the user would like to purchase some of the clothing the actress wears in movies and TV. The user adds the actor to a list of favorite actors to view clothing seen on the actress in video media. Video clips are presented of the actress wearing various clothing in video media. Hundreds of clothing objects are presented, with filters such as show title, year, genre, clothing type, color, or price, to remove clothing items the user is less likely to be interested in purchasing. The user selects a filter for dresses and reviews the video media clips and marketing information associated with dresses that the actress has worn in video media. The user adds 3 prospective items to a list and shares the list with a friend user through the social media layer. The friend approves of two items and the original user purchases the items.

Example 5—Concert Tickets

A user is viewing a movie through an online streaming service with the software application disclosed herein enabled. A song is played that the user enjoys. The user activates the interactive layer to view the songs artist and marketing information. Upon selecting the icon representing the song, the user finds that the artist is performing a live show in the area, and that tickets are available for purchase. The user shares the song with a family member using the social media layer, and both users decide to buy the song and buy tickets for the performance.

Example 6—Merchant Selling a Product

A merchant has designs a surfboard with a shark repelling audio device embedded within the board. The merchants surfboard is featured in a documentary about shark attacks, which is distributed on an online streaming service with the software application disclosed herein enabled. The merchant would like viewers to be able to buy the surfboard after activating the first interactive layer. The merchant pays the online streaming service to map the surfboard within the documentary and the merchant provides all purchasing information. An administrator at the online streaming service uses a computer assisted, semi-automatic process for identifying the object in each frame of the documentary. The administrator plays the documentary at a slow speed until the surfboard is visible. The administrator then clicks the object on a computer screen and a box marker appears, which is resized to encompass the board. As the frames of the video are advanced, the marker remains and the administrator resizes and moves the marker to track with the surfboard's movement throughout the frames. When the surfboard is no longer visible on the screen, the marker is removed by the administrator. The administrator then links the data related to the spatial and temporal location of the surfboard within the video media to the marketing information provided by the merchant.

Example 7—Purchasing a Vacation Package

A viewer is watching a movie taking place within beautiful scenery in an exotic land. The viewer does not know where the movie was filmed, but would like to travel there. The viewer activates the first interactive layer and is able to find vacation packages to the far off land. The viewer shares the information with family members using the social media layer, and each user is able to view clips of the destination, advertisements, and other associated media. The family purchases a vacation package through the marketing information provided by the application.

Example 8—Using Activity Data to Display Objects

A user views a TV program by streaming from an online streaming service equipped with the software and systems disclosed herein. The user is viewing a home design show, wherein hundreds of items and products are featured throughout the show. The show often contains an image of a fully decorated room being shown for a few seconds before switching images to another fully decorated room. In the past, the user has purchased items associated with the walls of the rooms. The user finds an image of an appealing room in the program. The user pauses the program and turns on the first interactive layer. Although 50 objects associated with marketing data are present on the screen, markers for only 10 are displayed. The majority of the 10 items are items that are on the walls in the room, as the items are given the highest display priority having been determined based on the user's past activity. The user then uses an adjustable slider to increase the number of markers on items to 25. The user views objects until deciding that the wall's color is ideal for combination with a unique picture frame. The user is able to purchase the desired color of paint, Bumble Cherry Bean, which has a name that the user could not have identified or predicted. The user is also able to purchase the picture frame displayed in the show.

Example 9—Associating Items with Marketing Information of a Different Item

A user views a movie set in the 1980's by streaming from an online streaming service equipped with the software and system disclosed herein. The user identifies a large, over the shoulder boom-box stereo that he would like to own. The user engages the first interactive layer and identifies the item, but is dismayed to find the boom-box is no longer manufactured and sold. However, multiple links to items that are related are shown, and purchasing information is provided. The user is able to purchase a boom-box that is not identical, but performs the same function as the unavailable boom-box. The user also would like to purchase a piece of clothing, which is still sold by the original manufacturer. However, another competing company has paid the online streaming service to remove the original clothing item purchase information and replace the item for sale with the competing companies own analogous clothing product and associated marketing information.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for providing information on items, services, or songs in a video media comprising:
   a) receiving the video media having a plurality of visual or audio objects in one or more frames of the video media;
   b) processing the video media to generate a first interactive video layer, wherein the processing includes:
      i. identifying one or more of the plurality of visual or audio objects within the video media,
      ii. associating product information to the one or more of the plurality of visual or audio objects to correspondingly form one or more items, services, or songs of interest;
      iii. tracking the one or more items, services, or songs of interest through the one or more frames of the video media; and
      iv. assigning a selectable visual indicator for each of the one or more items, services, or songs of interest, wherein the first interactive video layer is configured to display the selectable visual indicator;
   c) generating a video data comprising the video media, the first interactive video layer, and a second interactive video layer, wherein the video data is configured to be provided to a user via a first media playback device and to at least one guest via a second media playback device, wherein the second interactive video layer comprises a social media portion controllable by the user via the first media playback device, so as to interact with the at least one guest that is also a viewer of the video media through an interface displayed in the second interactive video layer via the second media playback device, wherein the second interactive video layer displays an interaction between the user and the at least one guest, and past interaction activity between a plurality of users in the social media portion, and wherein the user is capable of maintaining and toggling between a plurality of different conversations displayable in the social media portion in the second interactive video layer as an overlay to the video media displayed by the first media playback device, wherein the plurality of users either includes the user or does not include the user; and
   d) distributing information associated with the one or more items, services, or songs in the video media to the user.

2. The method of claim 1, further comprising: enabling the user to present the video data with or without the first interactive video layer being turned on or off based on selection by the user to view or not view the first interactive video layer, respectively; and enabling the user to present the video data with or without the second interactive video layer being turned on or off based on selection by the user to view or not view the second interactive video layer, respectively.

3. The method of claim 2, further comprising: displaying the video media and the first interactive video layer to the user; and receiving a selection of a given selectable visual indicator of a given item, service, or song of interest from the user to display marketing information of the given item, song, service, or song of interest to the user.

4. The method of claim 3, further comprising enabling the user to purchase the given item, song, or service of interest from the marketing information.

5. The method of claim 4, wherein the user is enabled to purchase while the video media is being displayed to the user.

6. The method of claim 1, further comprising copying a timed portion of the video data to a clip list based on a selection of an item, service, or song of interest by the user.

7. The method of claim 1, further comprising collecting data based on actions taken by the user.

8. The method of claim 1, further comprising: removing the product information from the one or more of the plurality of visual or audio objects; and associating different product information with the one or more of the plurality of visual or audio objects.

9. The method of claim 1, further comprising providing a third interactive video layer having one or more visual indicators to the server for distribution with the video media to the user.

10. The method of claim 9, wherein the one or more visual indicators include a link for one or more of a second video media, a side room digital layer, a promotional video, a game, and/or merchandise.

11. The method of claim 1, wherein the video data includes a third interactive video layer, wherein the third interactive video layer comprises one or more visual indicators.

12. The method of claim 1, wherein the video media includes one of a television episode or a movie.

13. The method of claim 1, wherein the identifying one or more of the plurality of visual or audio objects is performed manually through input of spatial and/or temporal data for each of the one or more items, services, or songs of interest within the video media.

14. The method of claim 1, wherein identifying one or more of the plurality of visual or audio objects is performed automatically by a computer program for visual and/or audio recognition and mapping.

15. The method of claim 1, wherein the first and second interactive layers are unaffected by ad blocking software.

16. The method of claim 1, wherein the interaction and the past interaction activity comprise a public or private conversation between the user and the at least one guest, wherein the plurality of different conversations comprises at least a public conversation which enables all viewers of the video media to join and a private conversation which enables a permitted subset of all viewers of the video media to join.

17. A non-transitory computer readable media encoded with instructions that, when executed by a processor, cause the processor to carry out at least the following steps:
 (a) processing video media to generate a first interactive video layer, wherein the processing includes:
  i. identifying one or more of the plurality of visual or audio objects within the video media;
  ii. associating product information to the one or more of the plurality of visual or audio objects to correspondingly form one or more items, services, or songs of interest;
  iii. tracking the one or more items, services, or songs of interest through the one or more frames of the video media; and
  iv. assigning a selectable visual indicator for each of the one or more items, services, or songs of interest, wherein the first interactive video layer is configured to display the selectable visual indicator; and
 (b) generating a video data comprising the video media, the first interactive video layer, and a second interactive video layer, wherein the video data is configured to be provided to a user via a first media playback device and to at least one guest via a second media playback device, wherein the second interactive video layer comprises a social media portion controllable by the user via the first media playback device, so as to interact with the at least one guest that is also a viewer of the video media through an interface displayed in the second interactive video layer via the second media playback device, wherein the second interactive video layer displays an interaction between the user and the at least one guest, and past interaction activity between a plurality of users in the social media portion, and wherein the user is capable of maintaining and toggling between a plurality of different conversations displayable in the social media portion in the second interactive video layer as an overlay to the video media displayed by the first media playback device, wherein the plurality of users either includes the user or does not include the user.

18. A computer-implemented system comprising: a digital processing device comprising: at least one processor, an operating system configured to perform executable instructions, a memory, and a computer program including instructions executable by the digital processing device to create an application for providing information on items, services, or songs in a video media, the application comprising:
 a) a software module for receiving a request for the generation of information regarding items, services, or songs presented in a video media from a first processing device of a user;
 b) a software module for linking the items, services, or songs with marketing and/or purchasing information;
 c) a software module for the generation of a first interactive layer to display with the video media, wherein said first interactive layer contains the items, services, or songs of interest linked to the marketing and/or purchasing information;
 d) a software module for the generation of a second interactive layer to display with the video media and optionally the first interactive layer, wherein the video media, the first interactive layer, and the second interactive layer are configured to be provided to user via the first processing device and to at least one guest via a second processing device, wherein the second interactive layer contains a social media portion controllable by the user via the first processing device, so as to interact with the at least one guest that is also a viewer of the video media through an interface displayed in the second interactive video layer via the second processing device, wherein an interaction between the user and the at least one guest, and past interaction activity between a plurality of users in the social media portion, are displayed in the interface in the second interactive video layer, and wherein the user is capable of maintaining and toggling between a plurality of different conversations displayable in the social media portion in the second interactive video layer as an overlay to the video media displayed by the first processing device, wherein the plurality of users either includes the user or does not include the user; and
 e) a software module for transmitting the first and second interactive layers to the first processing device of the user.

19. The computer-implemented system of claim 18, wherein the interaction and the past interaction activity comprise a public or private conversation between the user and the at least one guest, wherein the plurality of different conversations comprises at least a public conversation which enables all viewers of the video media to join and a private conversation which enables a permitted subset of all viewers of the video media to join.

* * * * *